United States Patent [19]
Lugash et al.

[11] Patent Number: 5,513,943
[45] Date of Patent: May 7, 1996

[54] LOAD ELEVATOR WITH COLUMNAR POWER ASSEMBLIES

[75] Inventors: Larry Lugash; Karapet Ablabutyan, both of Los Angeles; Samson Mkrtchyan, Burbank, all of Calif.

[73] Assignee: Tatcom, Inc., Huntington Park, Calif.

[21] Appl. No.: 326,586

[22] Filed: Oct. 20, 1994

Related U.S. Application Data

[63] Continuation-in-part of Ser. No. 22,981, May 16, 1994, Pat. No. Des. 367,748.

[51] Int. Cl.$^6$ .................................................. B60P 1/44
[52] U.S. Cl. ........................................ 414/545; 187/244
[58] Field of Search ..................... 414/540, 545, 414/557; 187/240, 244, 413; 296/182, 183, 204

[56] References Cited

U.S. PATENT DOCUMENTS

| | | | |
|---|---|---|---|
| 3,887,092 | 6/1975 | Leet | 414/545 |
| 4,015,686 | 4/1977 | Bushnell, Jr. | 187/244 X |
| 4,563,121 | 1/1986 | Drews | 414/545 |
| 4,683,987 | 8/1987 | Sakata et al. | 187/413 X |
| 4,806,062 | 2/1989 | Stier | 414/545 |
| 4,940,380 | 7/1990 | Ballyns et al. | 414/540 X |
| 5,110,251 | 5/1992 | Gray | 414/545 |
| 5,176,226 | 1/1993 | Martin et al. | 414/545 X |
| 5,263,808 | 11/1993 | Kert | 414/545 |

FOREIGN PATENT DOCUMENTS

| | | | |
|---|---|---|---|
| 181202 | 2/1955 | Austria | 296/182 |
| 514515 | 7/1955 | Canada | 296/182 |
| 592469 | 2/1960 | Canada | 187/244 |

*Primary Examiner*—David A. Bucci
*Attorney, Agent, or Firm*—Frederick E. Mueller

[57] ABSTRACT

A pair of lift columns telescopically contain a companion pair of tubular runners and a companion pair of fluid powered linear actuators to reciprocate the runners. The actuator circuit includes a flow divider with a pair of idler rotors keyed together for co-rotation in directions induced by the direction of fluid flow. The runners support a load platform with companion linkage systems, each with a flexible member between a rear portion of an outer platform section and an upper end connected to an inside face of the companion runner. Clearance is provided between the inside face of each runner and the companion side of the platform to receive the companion linkage system in a fully recessed condition when the platform is folded into a storage position. Coacting parts on each of the platform sides and the corresponding runner are interengageable and disengageable such that they are mutually engaged when the platform is in a load-bearing position. Each runner is fitted with upper and lower concave rollers having self-centering engagement with a pair of vertically elongate convex guide tracks fitted within the corresponding column.

41 Claims, 12 Drawing Sheets

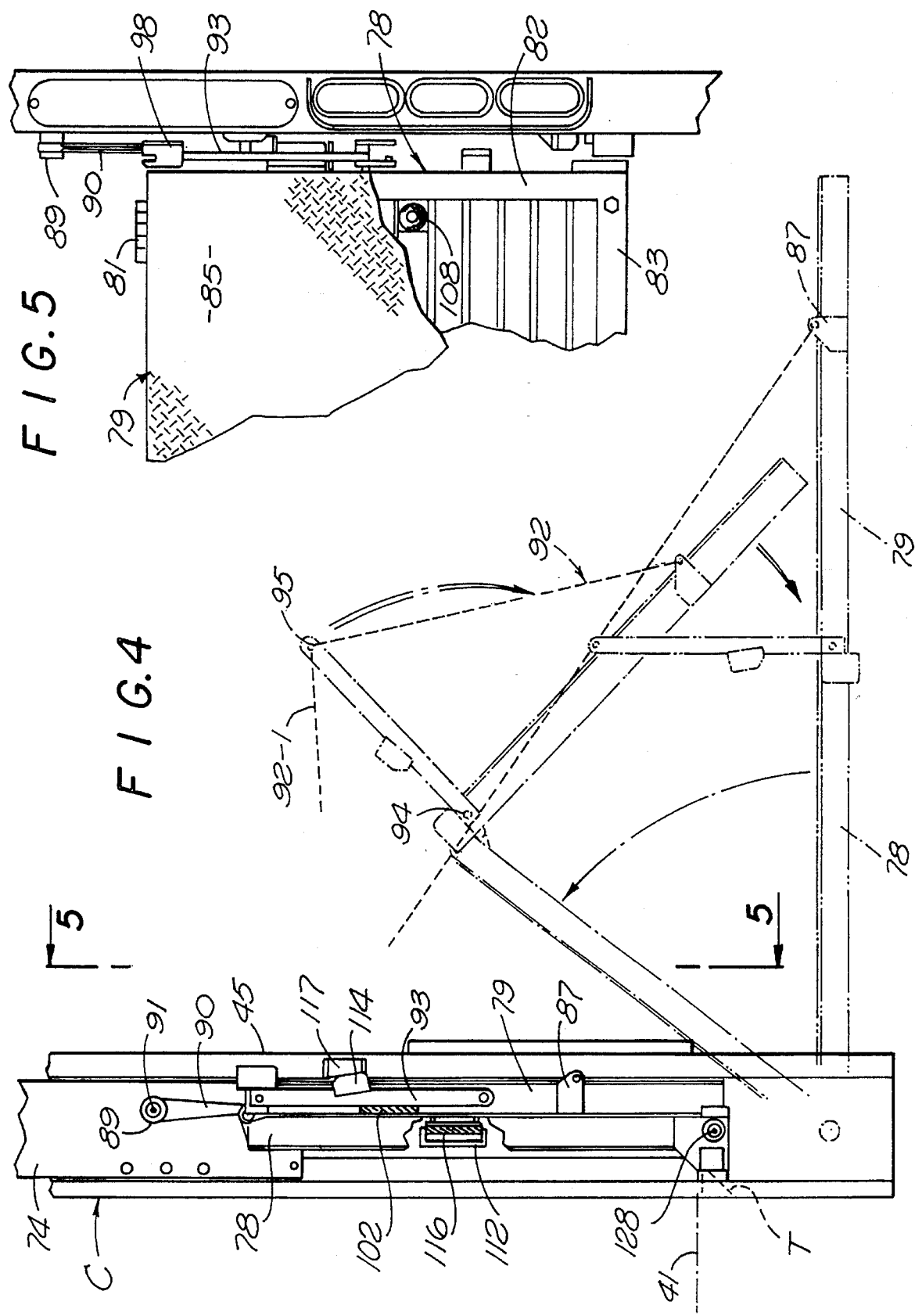

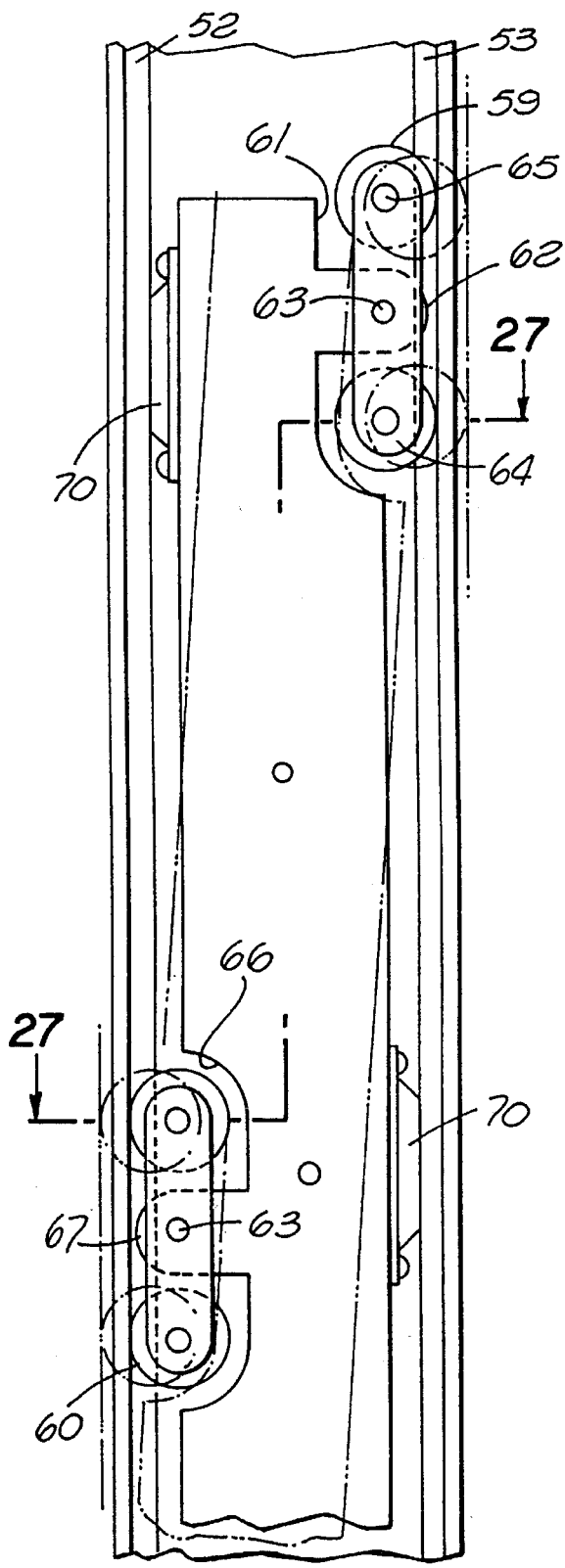
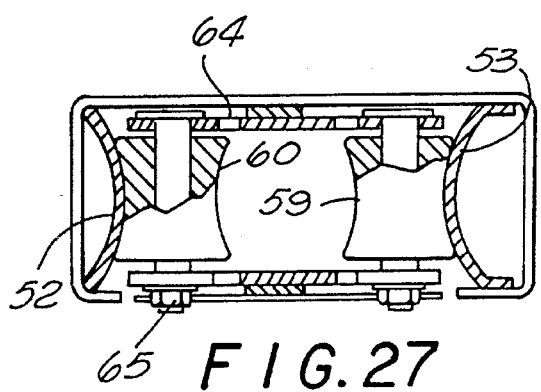
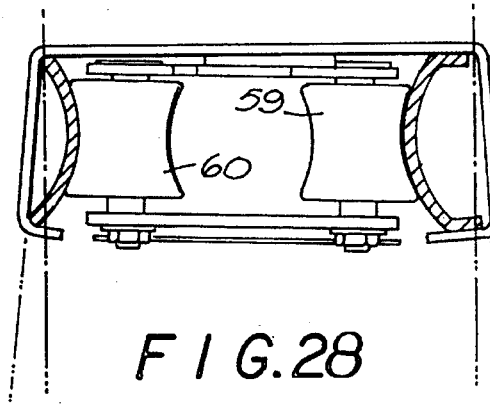
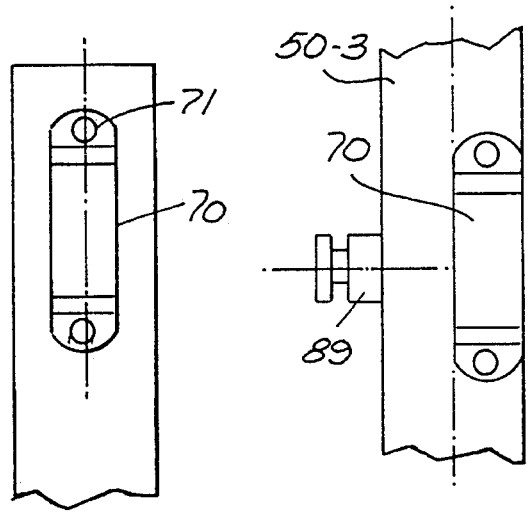
FIG. 26  FIG. 27  FIG. 28  FIG. 29  FIG. 30

LOAD ELEVATOR WITH COLUMNAR POWER ASSEMBLIES

REFERENCE TO RELATED APPLICATION

This is a continuation-in-part of application Ser. No. 29/022,981 filed May 16, 1994 now U.S. Pat. No. D387,748.

BACKGROUND OF THE INVENTION

The present invention relates generally to lead elevators or lifts and, more particularly, to hydraulically operated synchronized dual lift systems.

A dual lift system may comprise a parallel pair of vertically extending standards, posts or columns, each having a vertically disposed hydraulic cylinder for vertically raising and lowering a lead carried by the pair of cylinders. The pair of cylinders are actuated from a single source of hydraulic power and the hydraulic circuit contains a flow divider distributing hydraulic flow to each of the cylinders. Typically, the flow divider comprises a spool valve spanning the outlets to the pair of cylinders, the spool being counterbalanced by opposing springs at its opposite ends. This type of flow divider tends to lose its initial stabilizing setting over time, requires frequent readjustment, and is often unreliable in operation under conditions where the lead is off-center relative to the pair of columns.

It is also known to provide a lead elevator in the form of a liftgate comprising a rigid H-frame having a parallel pair of upstanding columns. The columns contain a corresponding pair of vertically disposed hydraulic cylinders having runners interconnected by a transverse heavy stabilizing bar typically supporting a two-section foldable platform actuated on each side by an actuating linkage system. The resulting H-frame is relatively expensive to ship, with or without having the platforms and linkage systems assembled thereto. Further, the heavy stabilizing bar not only entails the penalty of weight but also prevents folding of the platform sections into a fully recessed condition wherein neither the platform sections nor the linkage system parts protrude beyond a rear plane of the pair of columns. As a consequence, the driver of the vehicle on which such a liftgate is mounted must frequently reposition the vehicle away from a dock surface for added clearance to lower the folded platforms into a dock loading position. Even when the vehicle is properly positioned, the presence of the stabilizing bar typically creates a condition in which there is a large gap between the dock and the interior of the vehicle body requiring use of a dock plate to span the gap.

There are also liftgates comprising a vertical pair of columns each containing a runner assembly mounted for vertical reciprocation within the columns. Each runner is typically engaged with interior tracks or surfaces of the companion column by means of rollers. The contact is typically steel on steel and thus induces high wear on the contacting parts and resulting misalignment of the runner assembly relative to its column.

The foregoing and other disadvantages of the foregoing devices are obviated by the present invention.

SUMMARY OF THE INVENTION

Our invention comprises a dual lift system having a hydraulic system comprising a pair of linear actuators, such as cylinders, mounted within a pair of columns. The hydraulic circuit includes a flow divider with a pair of outlet passages, each having a pair of idler rotors of intermeshed spur-gear configuration, the companion pairs of rotors being keyed together for co-rotation in a direction corresponding to and induced by the direction of flow through the passages.

As embodied in a truck liftgate, the invention comprises a pair of columnar power assemblies that are largely mirror image assemblies of identical components. Each columnar assembly comprises a vertically elongate channel whose upper end pivotally supports the upper butt-end of a vertically elongate hydraulic linear actuator such as a cylinder having a piston driven rod axially reciprocable through its lower end. The lower end of the piston rod is pivotally drivingly engaged with an intermediate portion of a vertically elongate hollow runner in telescopic relationship. The runner, in turn, is telescopically supported by guide surfaces within the companion channel. Thus, above the pivotal connection, the runner is fitted with contact means comprising upper and lower concave rollers having self-centering rolling engagement with a parallel pair of vertically elongate convex guide tracks fitted within opposite sides of the channel. The longitudinal axis of the runner is slightly canted relative to the longitudinal axis of the companion channel in a manner that wearing of the roller surfaces tends to bring the longitudinal axes of the runner and channel into parallel, thus minimizing the frequency of replacement of the rollers.

The pair of columnar power assemblies can be employed with a variety of configurations of load platforms. Typically, the load platform will comprise a pair of platform sections pivotally connected to one another along adjacent edges with a butt hinge means so that the rear platform section can be inverted into substantial parallelism with a forward platform section. The forward platform section in turn is movable between horizontal load bearing position and a vertical position by a pivotal connection of opposite sides of its forward edge frame member with lower ends of the runners of the pair of columnar power assemblies. The two platform sections are interconnected at each side to a linkage system comprising a chain extending from a rear portion of the rear platform section to a point of pivotal connection at an upper end to an inside face of the companion runner assembly. At an intermediate portion, the chain is pivotally connected to a free end of an actuator bar having a root end pivotally connected to a side of the rear platform section adjacent to the butt hinge connection between the pair of platform sections. For rotating the forward platform section and thus opening and closing the pair of platform sections, the curb side columnar power assembly includes a hydraulically actuated crank mechanism.

A clearance is present between opposite sides of the folded pair of platforms and the inside surfaces of the pair of columnar power assemblies to receive the actuator bar and chain of the linkage system in a manner to be fully recessed therein. In order to restrain the chain of each linkage system during folding and unfolding, the root end of the actuator bar has a notch fitting engagable with an otherwise free portion of the chain.

The lower end portion of each runner assembly is fitted with a cushioned stop against which a companion piece affixed to the corresponding side of the forward platform section comes to rest. The underside of the forward platform section is fitted with a compressible bumper for cushioning the underside of the rear platform section which also carries on opposite sides a padded bracket to receive the corresponding actuator arm when the two platform sections are folded together. In order to tightly lock the two platform sections together in the fully folded position, each actuator arm also carries a wedge block in interfering alignment with a cam block fitted on a side of the corresponding channel when the folded platform sections are raised into a transit position. Thereupon, all of the cushioning members are biased together and the platform sections are locked in place in the recessed condition while the components of the linkage system at opposite sides of the platform are recessed and restrained within their respective clearances.

Each platform section comprises a rigid rectangular frame having a load bearing skin affixed to one side, the under side comprising a seamless corrugated sheet congruently fitted within the frame and peripherally welded to the frame. Each root portion of the corrugated sheet is welded to the underside of the skin at spaced intervals thus achieving a rigid unitary assembly.

The components of the liftgate comprise a companion pair of the columnar power assemblies, a platform of desired configuration, and a threshold bar which may be shipped as an unassembled set of components along with ancillary components of the hydraulic power and control system. Since the combination does not include a heavy H-frame, shipping costs are substantially reduced. Further, when the components are mounted at the tailgate opening of a truck, the absence of the heavy stabilizing bar between the runners permits the fully folded platforms and pair of linkages to be fully recessed within the pair of power assemblies when the platforms are in dock loading position to minimize the gap between the threshold bar and the loading dock.

The pivotal connections between opposite sides of the forward edge of the forward platform section and the companion runner assemblies are reinforced in a manner to minimize displacement of the platform out of an orthogonal attitude relative to the pair of runner assemblies when the platform is the horizonal load bearing position. The reinforcement may take the form of a reinforced flange projecting sidewardly at each of the side edges of the platform for rotation into and out of a slot of a companion reinforcing block secured to the runner. As a result, any lack of synchronization of the hydraulic reciprocation of the runners is compensated for.

The pair of tracks within each column define internal passages through which various hydraulic and electrical lines are trained. In the case of both columns, the electrical components comprise a harness electrically connected to one or more vehicle running lights interiorly mounted within the corresponding channel but having exposed lenses. Since the platform of the lift operates between the columns, the vehicle lights are not subject to being blanked out during any phase of operation of the lift. One of the columns may also receive an electrical harness for connection to a remote actuating switch mounted on the runner assembly of one of the columns. A portion of this harness is contained with a portion of the length of a hydraulic hose in an assembly defined by a length of helical wire coil, the assembled length including a running bight opposite portions of which are restrained within channels formed in part of the length of the runner and a lower end portion of the companion channel.

BRIEF DESCRIPTION OF THE DRAWINGS

FIG. 4 is a partial elevational view of the inside of the curb side columnar assembly and the fully raised and folded platform assembly but also showing, in dotted outlines, fully horizontally extended and intermediate partly folded positions of the partially lowered platform assembly.

FIG. 5 is a partial elevational view on the line 5—5 of FIG. 4, with parts broken away, showing a clearance recess at one side of the folded platform.

FIG. 26 is a schematic vertical sectional view illustrating interaction of a runner assembly relative to its corresponding support column, the parts being illustrated in phantom outline in an exaggerated condition under conditions of displacement due to stress.

FIG. 27 is a staggered section taken on the line 27—27 of FIG. 26 showing the relative relationship of the parts in a normal condition.

FIG. 28 is a view similar to FIG. 27, but showing the parts in the exaggerated stress condition shown in phantom outline in FIG. 26.

FIGS. 29 and 30 are partial elevational views of opposite faces of a runner showing the mounting of slider pads thereon.

DESCRIPTION OF THE PRESENTLY PREFERRED EMBODIMENT

Figure 1:
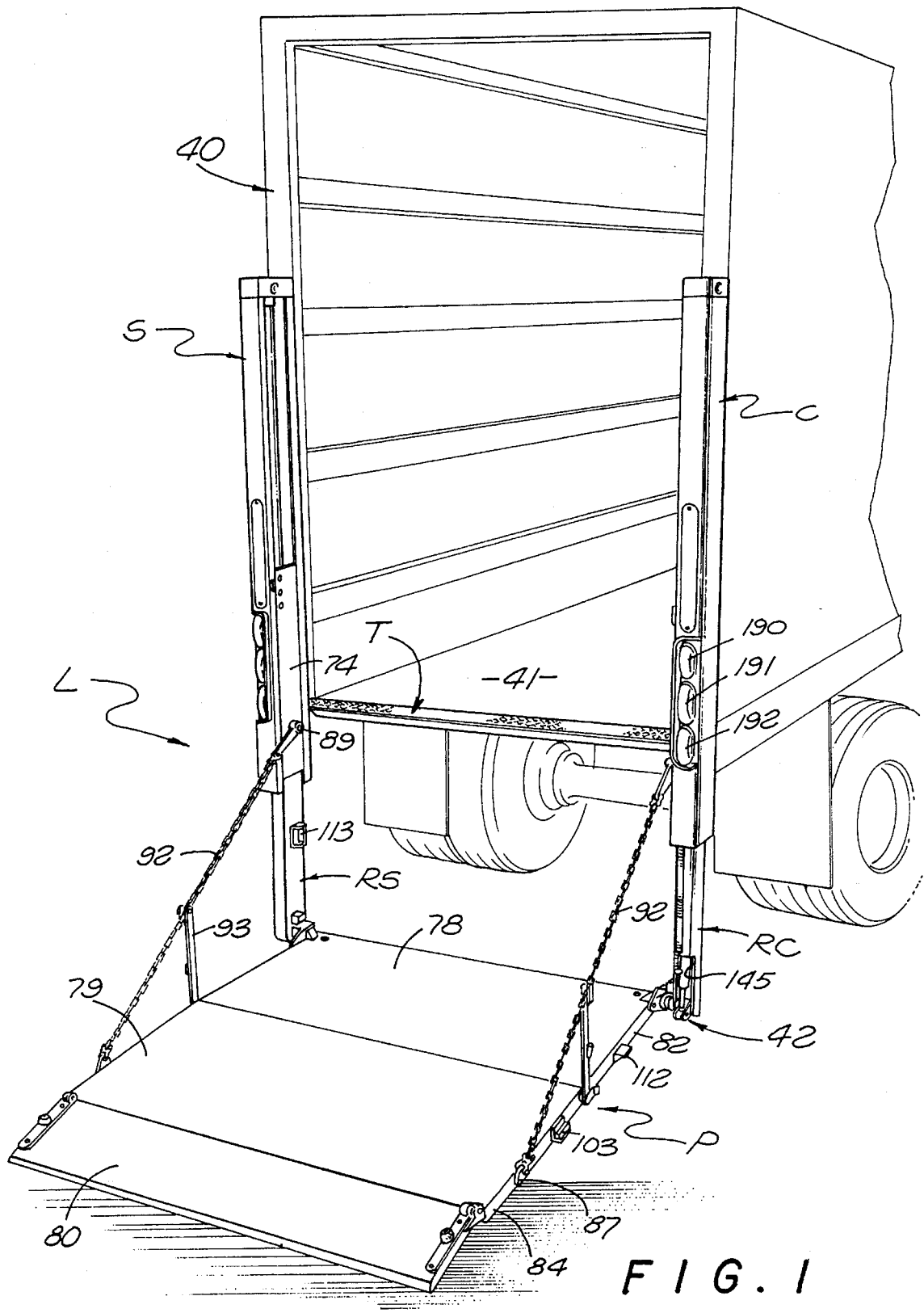
FIG. 1 is a perspective view of the invention embodied as a liftgate mounted at the rear of a freight vehicle.

Before explaining the invention in detail, it should be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein (e.g., inside, outside, front, rear, top, bottom) is for the purposes of description and should not be regarded as limiting.

In FIG. 1, the invention is shown as embodied in a liftgate, designated generally by the letter L, and in its usual environment as mounted on the rear vertical cornerposts of the rear end opening of a truck van or trailer body 40. The major components of the lift L comprise a right hand or curb side columnar power assembly C, a left hand or street side columnar power assembly S and a platform assembly P. The curb side assembly C mounts a downwardly extendable and upwardly retractable runner assembly RC while the street side assembly S includes a companion downwardly extendable and vertically retractable runner assembly RS. As will later appear, the telescopically mounted runner assemblies RS and RC are hydraulically operable in unison for raising and lowering the platform P between ground level and the level of a bed 41 of the body 40. Another component of the lift L is a threshold plate T that is secured in horizontally extending position to the rear edge of the bed 41. More particularly, the threshold plate T is of a triangular profile or cross-sectional configuration rigidly secured, as by welding, to the sill of the truck bed such that one flat face of the plate comprises a flush extension of the bed 41.

In large part, the columnar assemblies C and S are mirror image assemblies of identical components. The curb side assembly C differs however, in that the lower end portion of its runner assembly RC is fitted with a preferably hydraulically powered crank mechanism, designated generally by the numeral 42, to effect rotation of the platform sections through the various stages indicated in FIG. 4. Accordingly, in the ensuing description like components of the pair of columnar power assemblies will be identified by the same numeral.

Referring to FIGS. 4 and 14 through 30, each of the assemblies C and S comprises a vertically elongate metal channel or column 45 that is of a block C-shaped profile or cross sectional configuration. More particularly, each column has a web section 45-1, a forward wall 45-2, and a rear wall 45-3. The walls 45-2 and 45-3 are parallel to another and along their edges remote from the web 45-1 are integrally formed with inwardly turned flanges 45-4 and 45-5, respectively, disposed parallel to the web 45-1. As is shown in FIG. 27, the flanges 45-4 and 45-5 are relatively narrow and thus define a wide clearance gap between the confronting parallel edges thereof. When the components of the liftgate are mounted on a truck body, the front or forward wall 45-2 of the corresponding column is fitted on the rear face of corresponding rear corner post of the rear end opening of the vehicle as by welding or bolting thereto. Further, as indicated in FIG. 1, when mounted in place, the web portion 45-1 of the column is substantially flush with the corresponding side of the van body and the elongate clearance gaps between flanges 45-4 and 45-5 of the parallel pair of column assemblies confront one another.

Under a box-like column cap 44, the upper end of each column 45 rigidly mounts a parallel spaced apart pair of upstanding power cylinder support plates 46, oriented parallel to the major axis of the column profile having opposite ends resting on the column front and rear walls 45-2 and 45-3. The plates 46 are formed with coaxial holes to seat opposite ends of a transversely oriented cylinder support pin 47. The pin 47 pivotally supports a cap 48 comprising the butt end of an elongate fluid powered linear actuator or cylinder 49 that is thus suspended from the pin 47 to hang within the cavity of the column 45 so that the lower end of the power cylinder is displaceable in a direction parallel to said major axis of the column. The cylinder 49 may be of either the single or double acting type and encloses a piston powered rod 57 that is extendable and retractable through the lower end of the cylinder 49.

Figure 14:
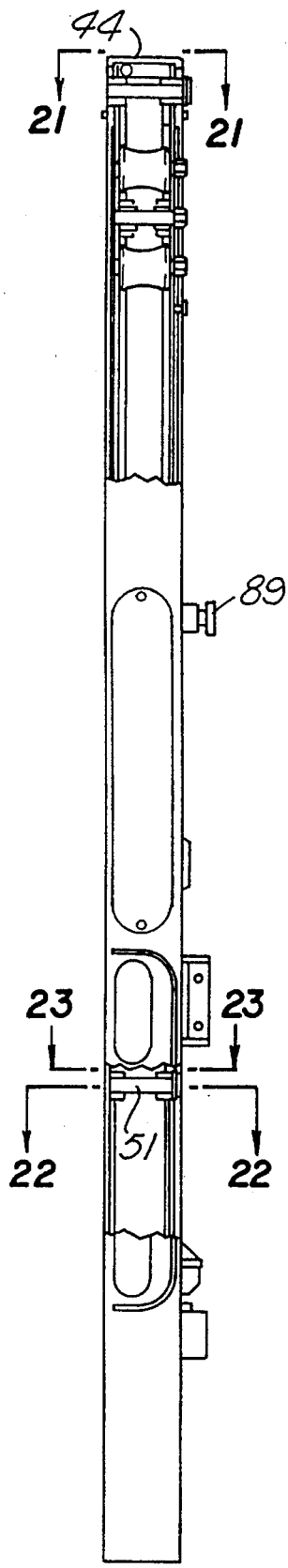
FIG. 14 is a rear elevational view of the street side columnar assembly, portions being cut away to show interior details of construction.
Figure 15:
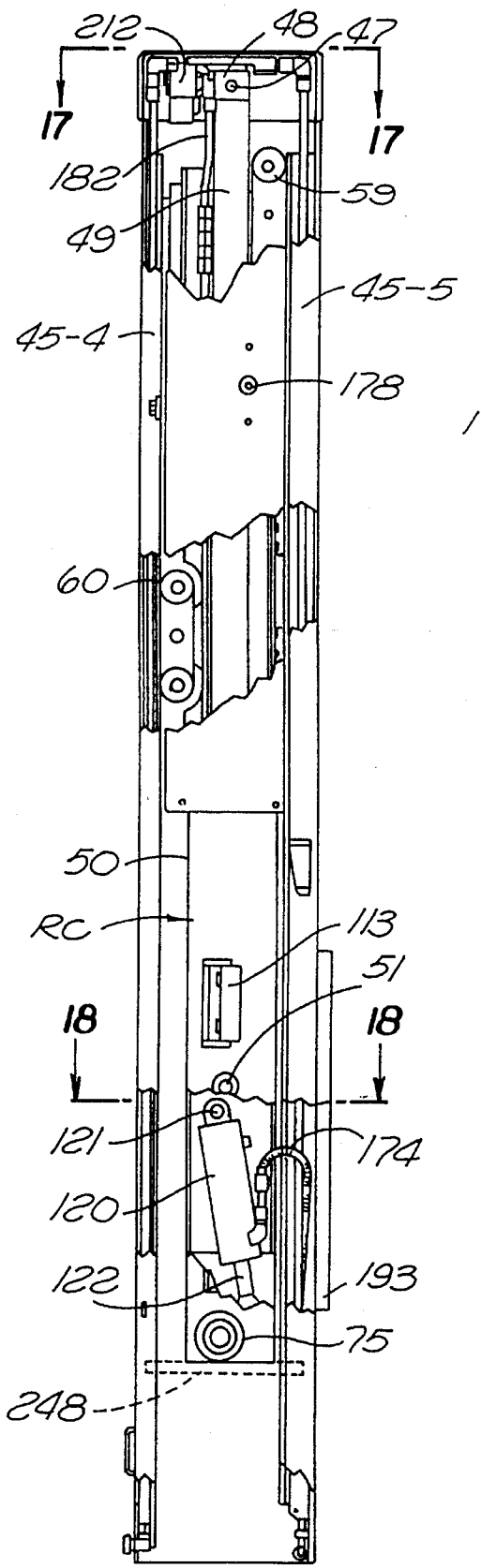
FIG. 15 is an elevational view of the inside of the curb side columnar assembly when its runner assembly is in a fully retracted position, with parts cut away to show interior details of construction and the curb side power mechanism for folding and unfolding of the platform sections.
Figure 16:
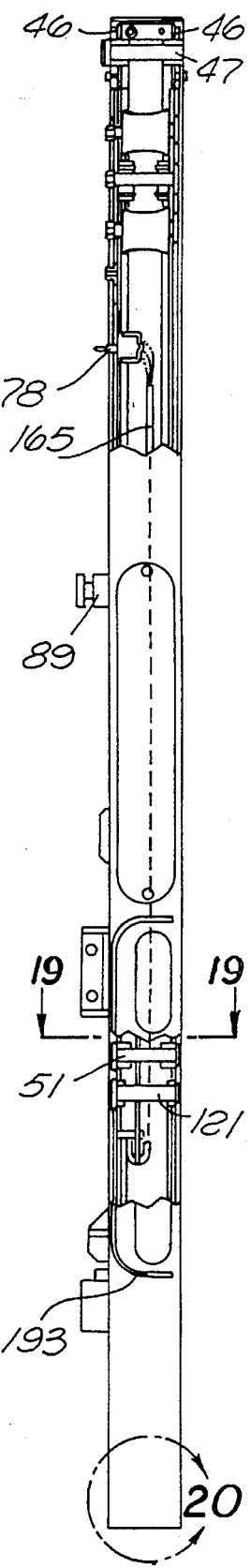
FIG. 16 is a rear elevational view of the columnar assembly of FIG. 15, portions being cut away to illustrate interior details of construction.
Figure 17:
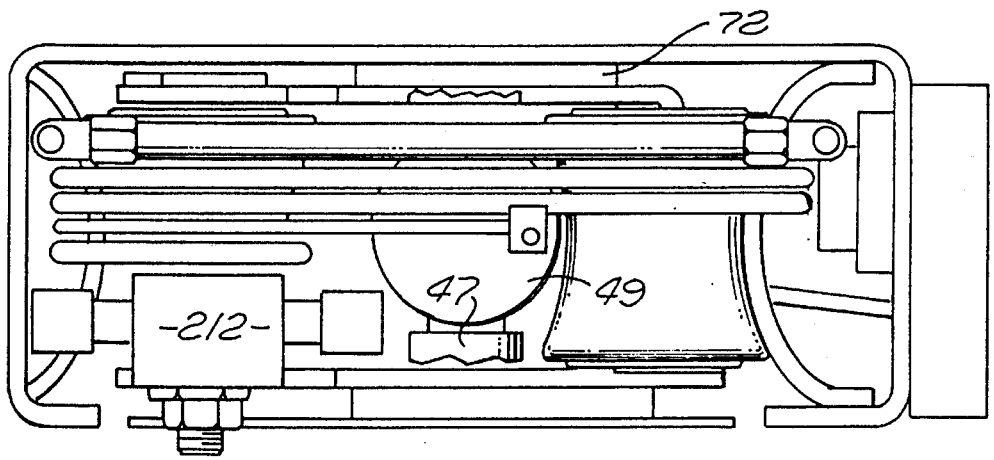
FIG. 17 is a top view taken in the direction 17 of FIG. 15, the top cover of the assembly having been removed.
Figure 22:
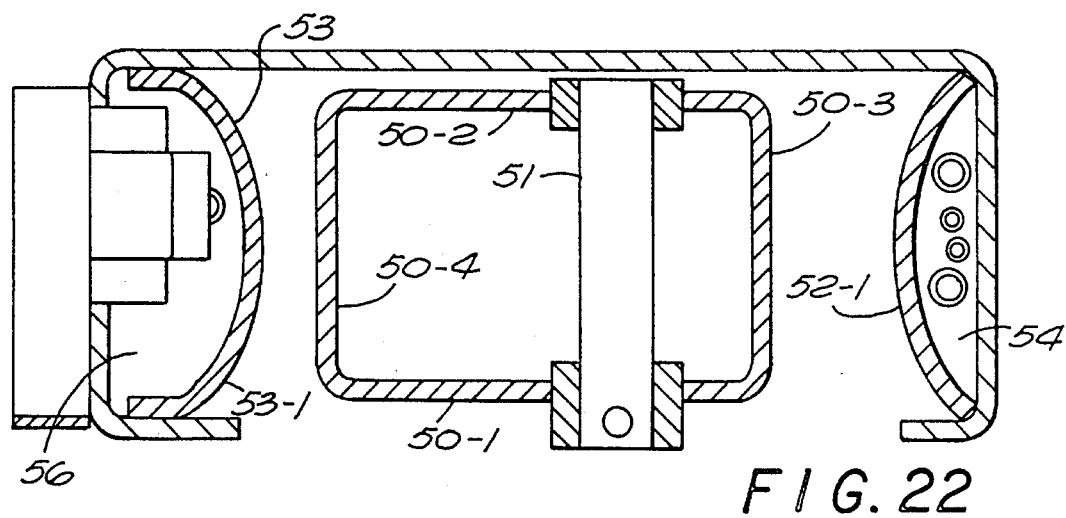
FIG. 22 is a sectional view taken on the line 22—22 of FIG. 14.

Also mounted within each column 45 is a tubular runner member 50 preferably having the rectangular cross-sectional configuration shown in FIG. 22. The vertically elongate runner 50 is of a length such that when it is in the fully extended position of FIG. 1 a major portion of the length of the runner remains supported within the corresponding column. The runner 50 is suspended from the piston rod 57 by means of a pin 51 having opposite ends journalled in an opposite pair of sidewalls of the runner member 50 on an axis parallel to that of the cylinder support pin 47. As is indicated in FIGS. 14, 15 and 16, the runner support pin 51 is located within a lower end portion of the runner 50.

The major axis of the profile of tubular runner 50 is parallel to the major profile axis of the corresponding column 45 so that an opposite parallel pair of sidewalls 50-1 and 50-2 of the runner are parallel to the web portion 45-1 of the corresponding column. The major axis of the runner 50 is substantially shorter than that of the profile of the corresponding column such that there is a substantial clearance between the front and rear faces 50-3 and 50-4 of the runner and corresponding front and rear faces 45-2 and 45-3 respectively of the corresponding column. Within these clearances, the column 45 is fitted with an elongate front track 52 and a rear track 53.

More particularly, the front and rear guide tracks extend over substantially all of the vertical length of the corresponding column. The front track 52 is fitted between and within the internal corners of the front wall 45-2 of the column as by having opposite edges of the track welded to the internal corners of the column. The track is of uniform arcuate cross-sectional configuration from end-to-end having an outwardly convex track surface 52-1 of a uniform radius, e.g., 3 inches, from side-to-side or edge-to-edge of the member. At the same time, a clearance passage 54 is defined between the track 52 and the front wall 45-2 of the channel through which hydraulic conduits and electrical wires can be passed from one end to the other of the track.

Similarly, the rear track 53 is fitted into the internal opposite corners at the rear wall 45-3 of the corresponding channel. The track 53 also has an outwardly convex track surface 53-1, preferably of the same uniform radius from side-to-side as the track surface 52-1. However, opposite longitudinal edges of the track 53 develop into an opposite pair of straight flanges 55 whereby the track defines a clearance passage 56 relative to the rear wall 45-3 of the channel that is of a larger cross-sectional area than the passage 54 at the front wall.

Figure 18:
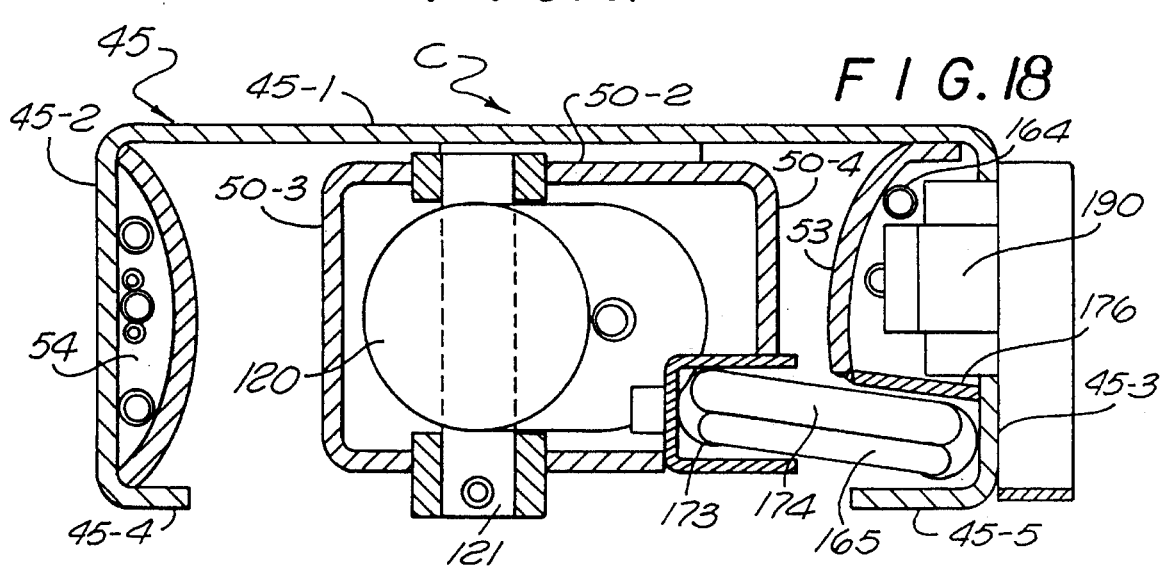
FIG. 18 is a transverse sectional view taken on the line 18—18 of FIG. 15.
Figure 19:
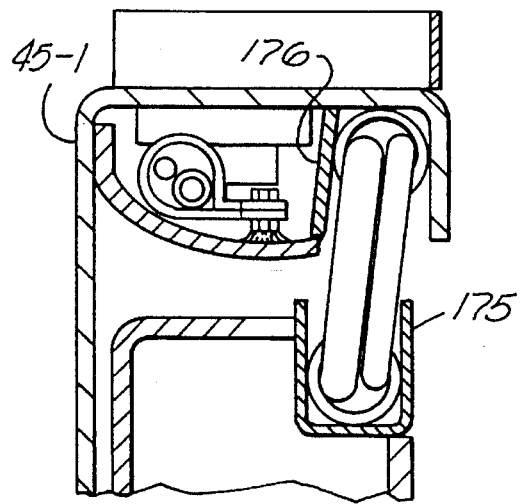
FIG. 19 is a partial sectional view taken on the line 19—19 of FIG. 16.

As shown in FIGS. 15, 18 and 22, the axis of pivotal connection 51 between the piston rod and the runner 50 is laterally offset relative to the longitudinal axis of the runner to be more adjacent to the forward wall 50-3 of the runner. Above the pin 51 an upper portion of the runner 50 is fitted at the front and rear walls thereof with vertically spaced apart preferably tandem pairs of rollers 59 and 60, having rolling contact with the parallel track surfaces 52-1 and 53-1. As can be seen from an inspection of FIG. 15, the longitudinal axis of the runner 50 is slightly canted relative to the vertical axis of the power cylinder 49 by virtue of the location of the pin 51 such that the runner 50 inclines slightly rearwardly and downwardly, which canted attitude is maintained during reciprocation of the runner by the spaced pairs of rollers 59 and 60. In lighter duty applications, each tandem pair of rollers may be replaced by a single roller.

More particularly, at the upper end of the runner 50 portions of the rear face 50-4 and opposite side walls 50-1 and 50-2 are cut away to provide clearance for a mounting means for the upper set of rollers 59. The relief may take the form of the profile 61, best seen in FIG. 26, which leaves a pair of rearwardly projecting ears 62 formed in the opposite side walls 50-1 and 50-2 of the runner. The confronting pair of ears 62 are formed with coaxial holes for the reception of opposite ends of a pin 63, opposite ends of which pivotally support the mid-points of a parallel pair of straps 64. Each of the opposite ends of the straps 64 supports an end of a pin or shaft 65, each of which passes co-axially through the hub of the corresponding roller 59 to rotatably support the same.

Similarly, for mounting the lower set of rollers 60, the forward wall 50-3 and opposite side walls 50-1 and 50-2 of the runner 50 are relieved to define the profile 66 and spaced ears 67 also seen in FIG. 26. As before, the ears support opposite ends of another shaft 63 whose opposite ends, in turn, pivotally support a pair of the parallel straps 64 whose opposite ends mount the pair of roller bearing shafts 65.

Each of the rollers 59 and 60 has a periphery of concave configuration formed on a radius matingly complementary to that of the track surfaces 52-1 and 53-1. The rollers and tracks have the centers of their respective radii within a common vertical plane substantially bisecting the rollers and the track surfaces. Rollers 59 and 60 are thus matingly engaged by the track surfaces throughout their axial width. It should also be observed that each of the rollers 59 and 60 is slightly shorter in axial length than the space between confronting surfaces of the corresponding pair of supporting straps 64. As a result, each of the rollers 59, 60 is axially displaceable with respect to the shaft 65 on which it is supported. The rollers 59, 60 are preferably made of a high density polymer although a metallic material can also be used.

The front face 50-3 of the runner 50, at a location opposite to the area of the upper rollers 59 mounted on the rear face, is fitted with a pad 70 of a thickness to slidably engage the confronting track 52. As indicated in FIG. 30, the pad 70 may be offset from the midline of the runner and has bevelled upper and lower edges. Similarly, the rear face 50-4 of the runner, in an area opposite the general area of the lower rollers 60, is fitted with a similar pad 70, the pads being held in place by appropriate fastening means 71. The side face 50-2 of the runner is externally fitted over a major portion of its vertical extent with a wide pad 72 of a thickness to slidably engage the inside face of the confronting web portion 45-1 of the corresponding column 45. The pads 70 and 72 are preferably made of a hard plastic material, having a low coefficient of friction and are adapted to cushion the corresponding runner during it's reciprocation and against vibration.

The inside face of each runner 50 is partially covered by a rectangular cover sheet 74 having a slight clearance between its opposite vertical edges and the inside flanges 45-4 and 45-5 of the corresponding column. In vertical extent, the cover 74 extends from about the upper end of the corresponding runner downwardly to at least cover the lower set of rollers 60.

In order to support the platform assembly P on the runner assemblies RC and RS, the lower end of each runner is provided on the lower end of its inside face with a bearing designated generally by the numeral 75. It will be understood that the pair of bearings 75 are coaxially related. As shown in FIG. 15, each bearing 75 has its axis closer to the front wall 50-3 of the corresponding canted runner such that its axis, the axis of the runner-cylinder connection 51 and the axis of the cylinder support pin 47 are all aligned substantially along the mid-line of the corresponding columnar assembly C or S.

Referring to FIG. 1, the platform assembly P is illustrative of one of several different kinds of platforms that may be employed with the lift of this invention. In the illustrated case, the platform assembly P comprises a main or forward platform section 78 and a rear platform section 79 that along its rear edge is fitted with a retention ramp 80. At opposite sides of its forward edge the main section 78 is pivotally supported by the bearings 75 for rotation between the horizontally extending position illustrated and a vertically erect position between the runner assemblies RC and RS. The adjoining edges of the main platform section 78 and rear platform section 79 are pivotally interconnected by a butt hinge means 81 so oriented that when the main platform section is turned upwardly from the FIG. 1 position, the underside of the rear platform section swings toward the underside of the main platform section as indicated in FIG. 4. The retention ramp 80 may be of the type disclosed in co-pending application Ser. No. 08/242,868, that is invertible and latchable over the top or load surface at the rear end of the rear platform section 79. However, it should be understood that the pair of lifting columns of this invention have utility with single piece platforms and types of multi-piece platforms other than that depicted in FIG. 1.

Referring to FIG. 5, the main platform section 78 comprises a rigid rectangular frame, preferably made of structural tubing of a square cross section, including opposite side frame members 82 and a transverse pair of forward and rear edge frame members 83. The rear platform section 79 has a similar frame, including a pair of opposite side frame members 84. Both frames are covered on their top side by a rectangular sheet metal skin 85, which may be diamond plate, welded to the underlying frame. Each of the platform sections 78 and 79 is further structurally reinforced by a single seamless rectangular sheet 86 of corrugated metal on the underside thereof, congruently fitted within and, at peripheral portions, welded to the corresponding platform frame. Thus, the corrugated sheet 86 preferably is of the section or profile shown in FIG. 12 comprising flat crests and flat roots 86-1, the root sections being welded at spaced intervals therealong to the underside of the platform skin 85. The effect is thus one of a plurality of laterally spaced apart transverse hollow beams defined by the corrugated sheet that rigidly support loads placed on the platform surface.

Rotation of the main platform section 78 between vertical and horizonal positions is effected by the powered crank means 42. In order to effect corresponding rotation of the rear platform section 79 a collapsible linkage system is provided that is interconnected between the platform sections and the runner assemblies RC and RS.

Figure 6:
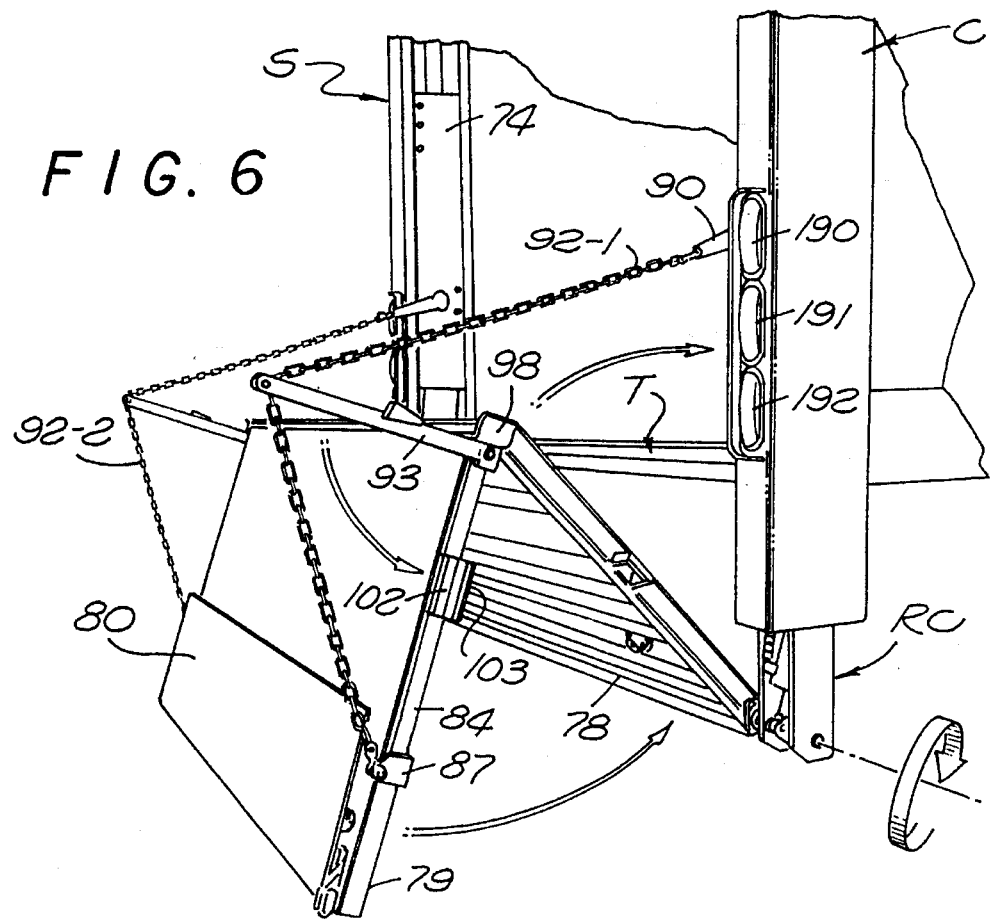
FIG. 6 is a perspective view of the liftgate of FIG. 1 but with the platform sections in substantially the intermediate position indicated in dotted outline in FIG. 4.
Figure 7:
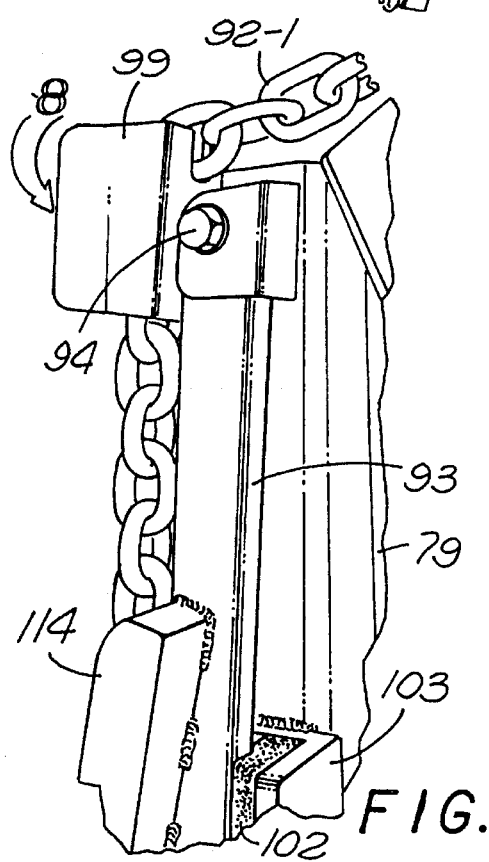
FIG. 7 is a partial perspective view of the area of pivotal interconnection of the two platform sections, particularly showing portions utilized in constraining the corresponding chain during folding and unfolding movement of the two platform sections.
Figure 8:
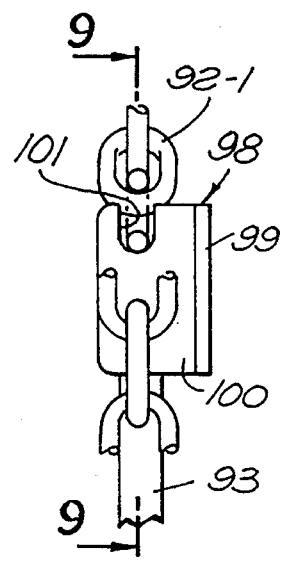
FIG. 8 is a partial elevational view taken in the direction of the arrow 8 of FIG. 7.
Figure 9:
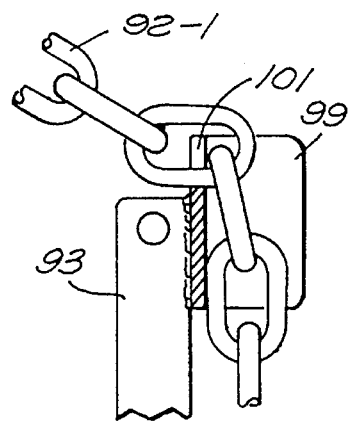
FIG. 9 is a partial sectional view taken on the line 9—9 of FIG. 8.

Referring to FIGS. 1, 4 and 6, the inside face of each runner and cover assembly has an inwardly projecting pin 89 that pivotally supports the root end of an arm 90 whose free end is swingable on an axis 91 that is parallel to the axes of the bearings 75 and platform hinge 81. The swingable free end of each arm 90 is connected to an upper end of an elongate flexible member such as link chain 92 whose other end is connected via a shackle to a bracket 87 affixed to and upstanding from a rear platform side frame member 84. An actuator arm 93 has a root end pivotally connected at 94 to the rear platform side frame member 84 adjacent to the hinge 81 interconnecting the two platform sections while an intermediate portion of the chain 92 is pivotally connected with a pin through a link at 95 to a yoke comprising the outer end of the actuator arm 93. The actuator axes 94 and 95 are parallel to the platform hinge.

The geometry of this linkage mechanism is substantially that shown in FIG. 4 and effects co-rotation of the two platform sections 78 and 79 substantially in the manner depicted therein in solid and dotted outlines. FIG. 6 depicts an intermediate phase of the folding of the two platform sections while the chain 92 on each side remains in tension. As the forward platform section advances farther toward the fully erect position, a chain section 92-1 between the arm 90 and the actuator arm 93 and the other chain section 92-2 between the actuator arm 93 and bracket 87 will become slack. Accordingly, the linkage system is adapted on each side for maintaining both chain sections 92-1 and 92-2 in substantial parallelism with the corresponding platform side frame members.

More particularly, the root end portion of the actuator arm 93 has a generally L-shaped bracket 98 affixed thereto. The bracket has an upstanding flange 99 oriented parallel to the actuator arm 93 for retaining the chain against sideward displacement outwardly of the platform sections. The bracket 98 also includes a base portion 100 formed on one edge with a notch 101 adapted to capture a link of the chain section 92-1 as the platform sections approach the fully closed condition. As the chain section 92-1 slackens upon continued closing of the platform sections, the actuator arm 93 is gravitationally biased into substantial parallelism with the outer platforms section 79, coming to rest against a compressible pad 102 carried by a flange of an L-shaped bracket 103 affixed to the corresponding sideframe member 84.

As is indicated by the two dotted outline positions in FIG. 4, folding and unfolding of the two platform sections 78 and 79 is performed when they are at a lower position than their fully raised condition shown in solid outline in this FIG. In this connection, a means is provided for biasing the two platform sections slightly apart when in the partly lowered condition, while a camming means or the like is provided for wedging the two platforms together into substantial parallelism as they are raised into the fully elevated condition.

Figure 12:
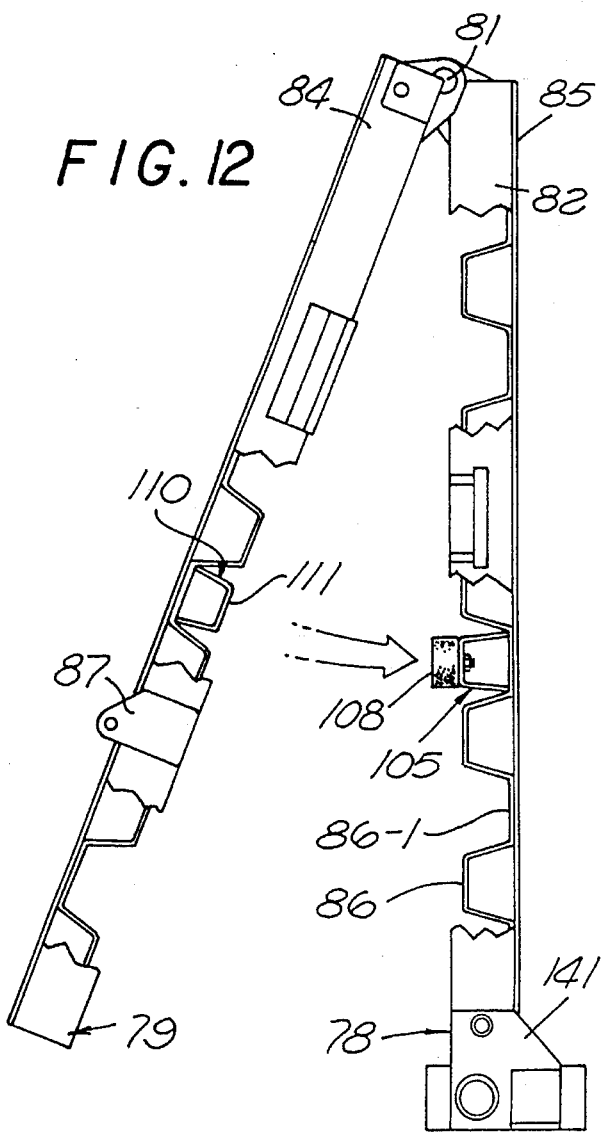
FIG. 12 is a side elevational view of the foldable platform sections in an angularly separated condition, portions being cut away to illustrate interior details of construction.
Figure 13:
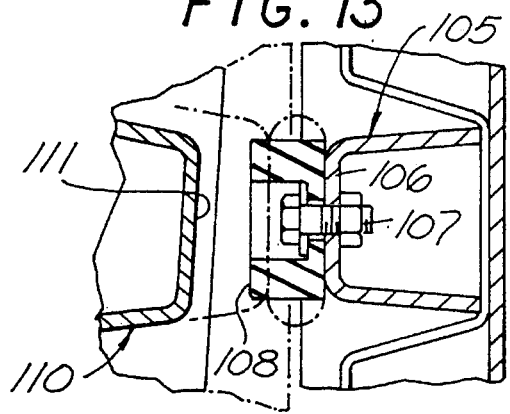
FIG. 13 is a partial sectional view of a bumper pad area of the main platform section shown in FIG. 12 and showing, in phantom outline, a fully compressed condition of the bumper pad upon complete closing of the outer platform section.

More specifically, referring to FIGS. 12 and 13, a cup-like bracket 105 is seated and affixed, as by welding, on the flat root section 86-1 of one of the valleys of the corrugated sheet 86 of platform section 78. The bracket has a flat dome portion 106, preferably protruding slightly above the level of the crests of the corrugated sheet that centrally mounts a fastener means 107 having a head portion externally of the dome to secure a base portion of a annular cushion 108. The cushion 108 is made of an elastomeric material and the axial dimension of the cushion supporting structure is such that the annular face of the cushion 108 protrudes into the space occupied by the rear platform section 79 when it swings into parallelism with the forward platform section 78.

In somewhat similar fashion the rear platform section 79 and a root portion 86-1 of a transverse valley of its corrugated sheet 86 is fitted with a cup-like bracket 110 on a radius relative to the platform hinge connection 81 like that of the cushion 108. The bracket 110 is configured with a preferably flat dome section 111 for engagement with the annular surface of the cushion 108 when the two platform sections are swung together in the manner indicated by the directional arrow of FIG. 12. The bracket 110 has an axial dimension such that when the two platform sections are brought into parallelism, as indicated in phantom outline in FIG. 13, the cushion 108 is axially compressed so that when the two platform sections are released from the restraint holding them into parallelism, the cushion 106 expands to bias the rear platform section 79 away from the forward platform section.

Figure 10:
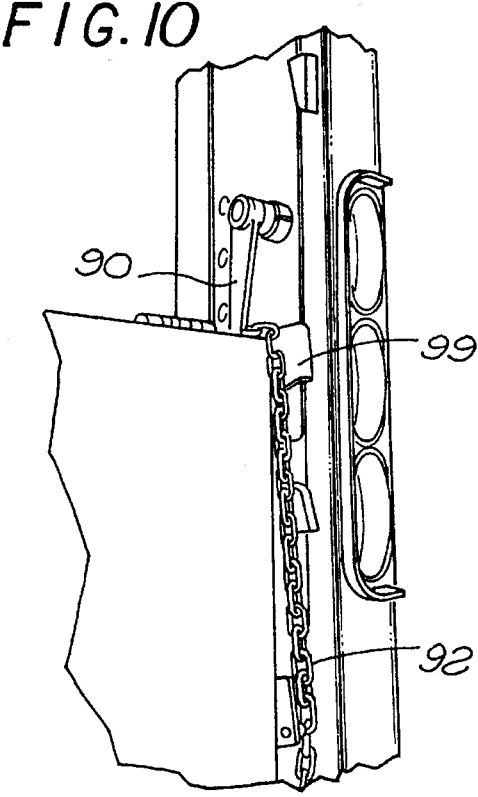
FIG. 10 is a partial perspective view of the curb side columnar assembly and corresponding side of the platform assembly, the latter being shown on a fully closed and raised condition.
Figure 11:
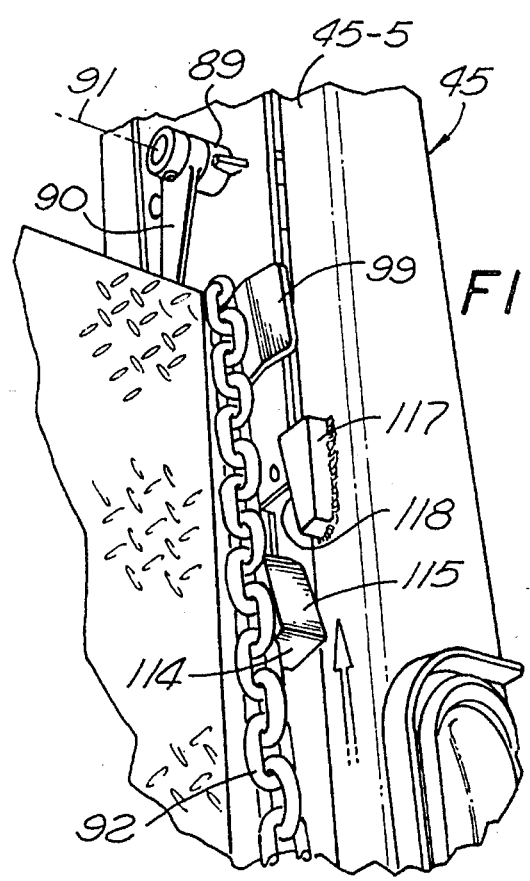
FIG. 11 is a partial perspective view similar to FIG. 10, but showing parts in their relative positions during lifting of the platform assembly into the fully raised condition of FIG. 10.

Referring to FIG. 4, a wedge block 114 is secured to the outside of the actuator bar 93 of the rear platform section at a location intermediate its opposite ends. The wedge block extends above an edge of the actuator arm to present an exposed flared surface 115. Referring to FIG. 11, the flange 45-5 of the column 45 has a vertically disposed cam block 117 secured thereto, having a forward face 118 that inclines downwardly and rearwardly in interfering alignment with the profiled wedge block surface 115. Thus, when the two platform sections are lifted from the position of FIG. 11 into the fully elevated position shown in solid outline in FIGS. 10 and 4, the rear platform section 79 is wedged into parallelism with the forward platform section 78 to compress the cushion 108 of the forward platform section.

The forward platform section 78 on each of its side frame members 82 is fitted with a block 112 while each of the runner assemblies RS and RC is fitted on its inner face with a corresponding stop member 113. Each stop member and the pair of blocks 112 are on the same radius relative to the platform hinge such that when the forward platform section moves into the vertical position the stop 113 engages an elastomeric pad 116 fitted on the block 112.

When the two platform sections have been folded together and raised and wedged together into the transit position, all of the pads 102, 108 and 116 are in a compressed state. Thus, when the folded platform sections are lowered to an extent that the wedge block 114 is released from contact with the cam block 117, the accumulated compressive forces are released by displacing the rear platform section 79 rearwardly relative to the forward platform section 78. This arrangement is adequate for partially opening the platform sections before actuation of the crank means 42 in most attitudes of the truck. However, a torsion spring 119 coaxially supported on the bearing 75 is primarily relied on for this purpose, particularly when the truck points downhill.

Figure 2:
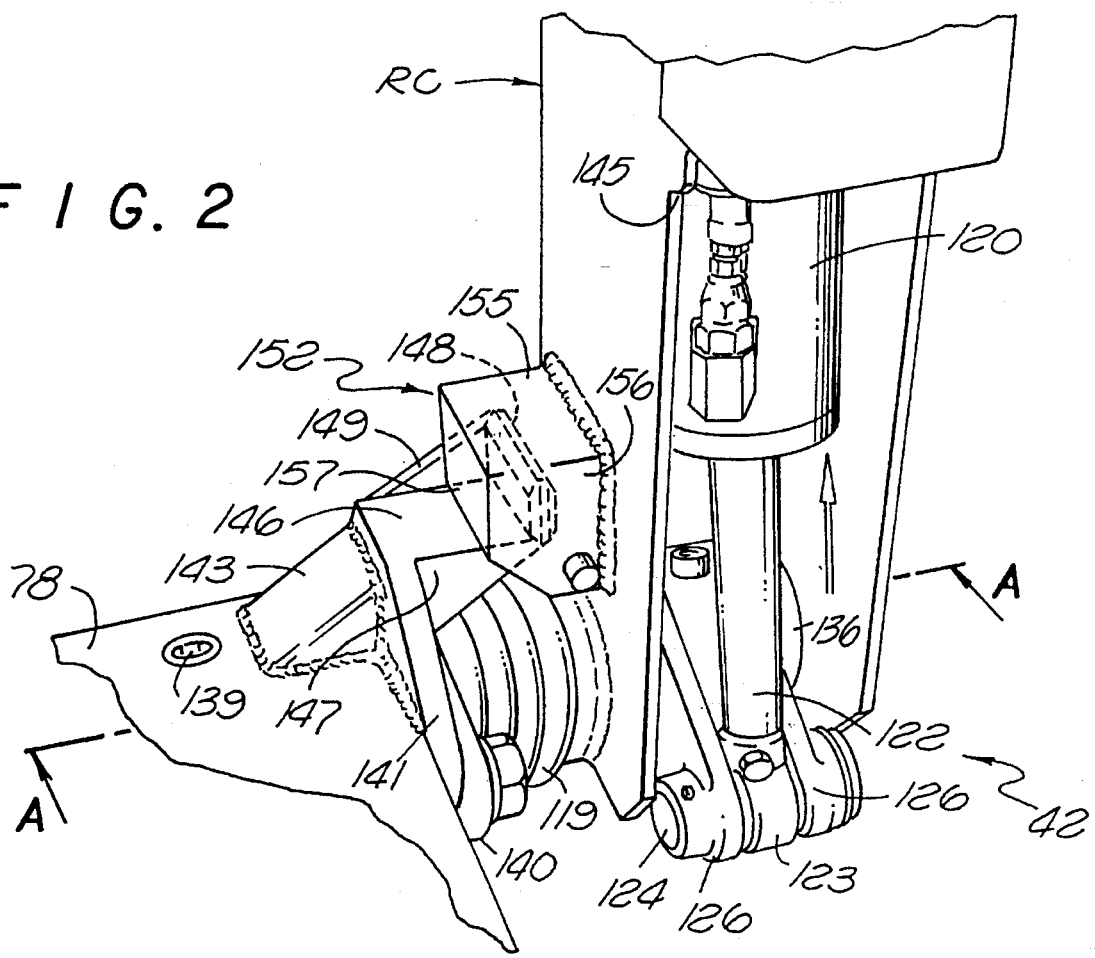
FIG. 2 is a fragmentary perspective view of the lower end portion of the curb side column assembly of FIG. 1 and the corresponding corner of the load platform.
Figure 3:
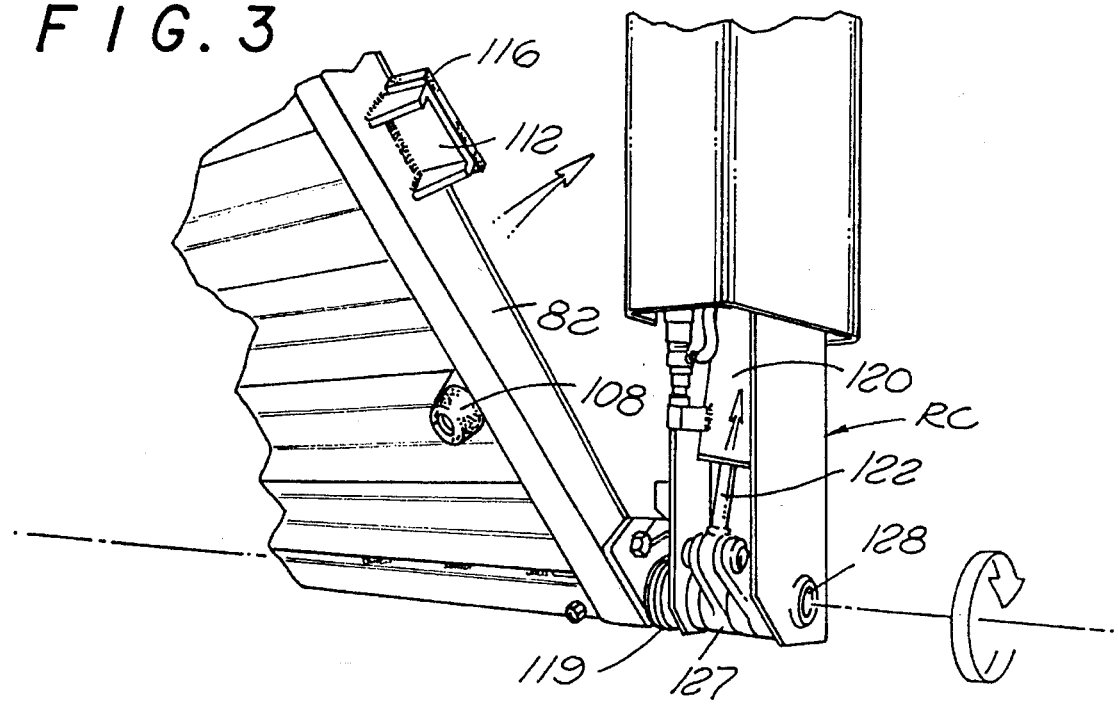
FIG. 3 is a partial perspective view of substantially the same area as depicted in FIG. 2, but with the parts in different relative positions.
Figure 2A:
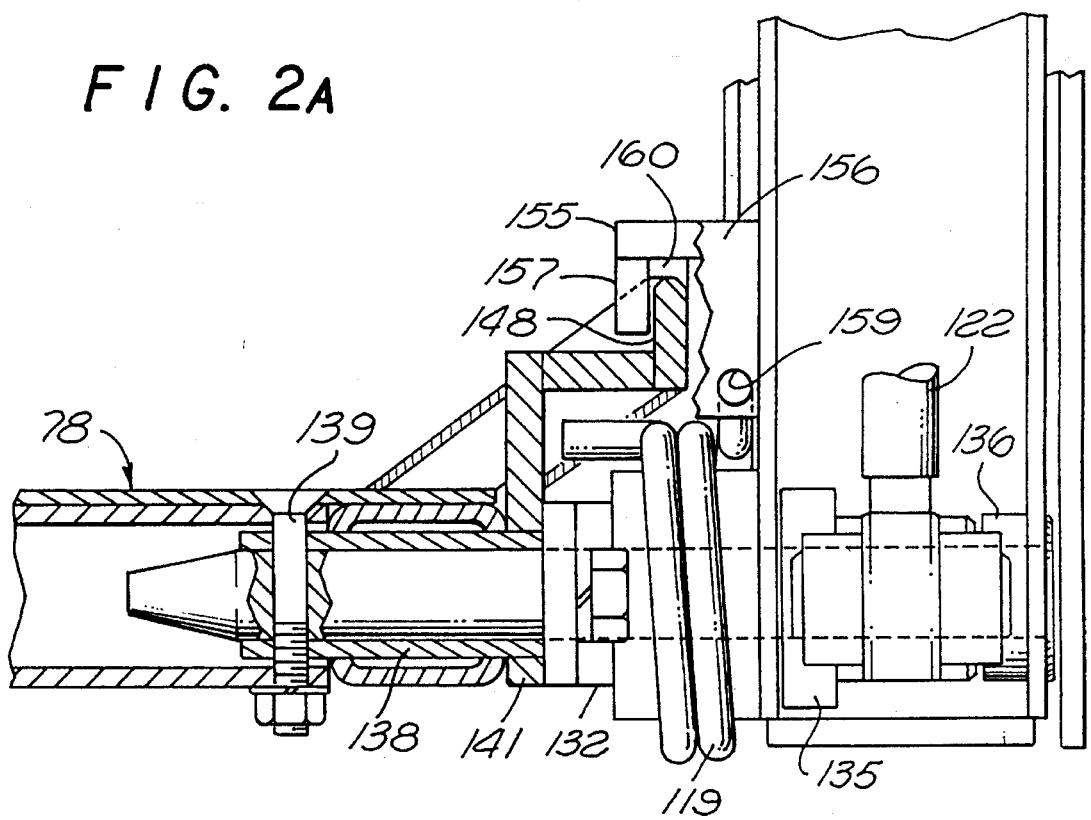
FIG. 2A is a view, partly in section, taken on the line A—A of FIG. 2.
Figure 2B:
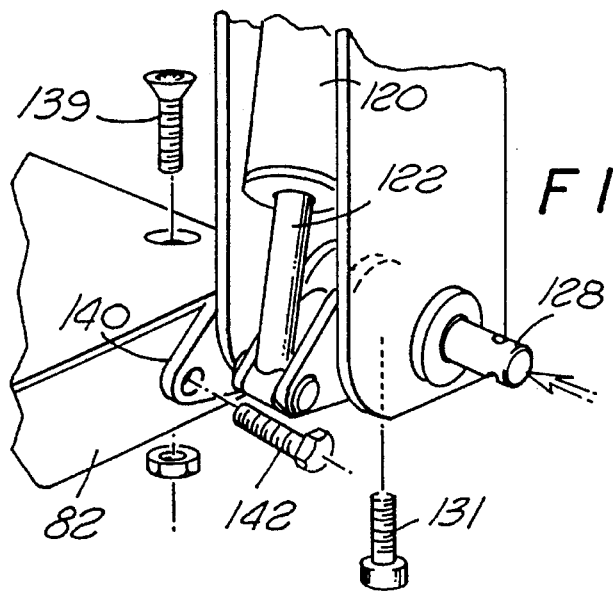
FIG. 2B is a partial exploded perspective view of the platform pivot hinge construction at one side of the platform.
Figure 2C:
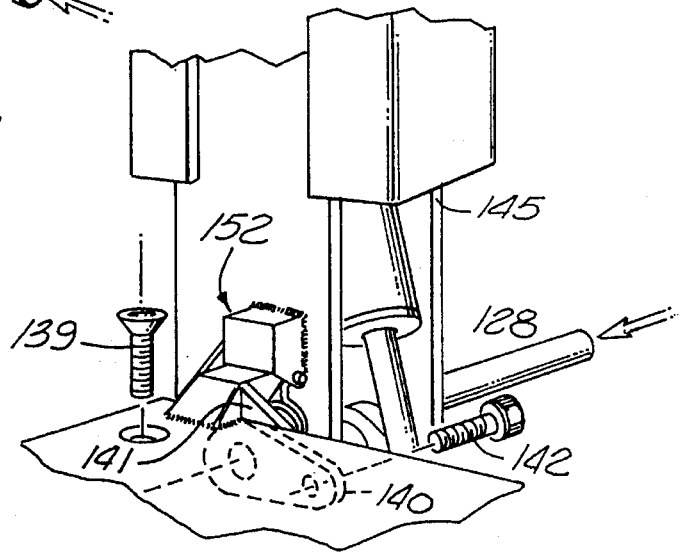
FIG. 2C is a partial perspective view of the general area shown in FIG. 2B, but from the opposite side.

Referring to FIGS. 2–2C and 3, the powered crank means 42 for effecting rotation or turning of the platform sections is mounted at the lower end of the curb side runner assembly RC. The crank means comprising a preferably single acting fluid powered cylinder 120 having an upper butt end pivotally connected to the inside faces of the runner 50 by a pin 121 fixedly projecting therebetween. The pin 121 is positioned adjacently beneath the runner support pin 51 and slightly closer to the front wall 50-3 of the runner. The cylinder 120 inclines downwardly rearwardly and has a piston rod 122 projecting axially therefrom to terminate in an eye 123 that is coaxially rotatably seated on a crank pin 124.

On opposite sides of the piston rod eye 123, opposite ends of the crank pin 124 are journalled in aligned holes of a companion pair of crank arms 126, which have an integral root hub 127 coaxially mounted on a platform pivot pin 128. The crank hub 127 is keyed to the platform pin 128 for co-rotation by a diametrically oriented bolt 131. Inwardly of the crank hub the platform pin 128 coaxially mounts a tubular member 132. A concentric annular spacer 135 bears against the inside face of hub 127. The tubular member 132 projects inwardly through the bearing 75 mounted on the inside face of the runner 50 at its lower end. Coaxially with the bearing 75, the outer wall of the runner 50 mounts a bearing 136 that receives the outer end of the platform pivot pin 128.

The inner end of the platform pivot pin 128 is keyed to the platform by a fastener means 139 through a sleeve 138 fixed in the adjacent end of the forward edge frame 83 of the forward platform section 78 (FIG. 2A). The inner end of the tubular member 132 is integrally formed with a radially extending tear drop crank arm 140 that is oriented in flush engagement with a plate 141 fixed on the corresponding platform sideframe 82. The outer end of the crank arm 140 receives a bolt 142 that is anchored within the platform side frame member 82. Accordingly, the forward platform section 78 is keyed to the piston rod 122 of the power cylinder 120 such that they undergo movement simultaneously.

In order to provide clearance for actuation of the crank mechanism 42, the rear end wall 50-4 and portions of the opposite walls 50-1 and 50-2 of the curb side runner 50 are cut away to provide a relief 145, in combination with the open lower end of the runner. The pivotal platform connection of the runner assembly RS of the street side assembly S is essentially the same as that of the runner assembly RC of the curb side assembly C, except that as the former is not equipped with another platform operating cylinder and it has no similar relief 145, nor the parts associated with the cylinder 120 such as the crank arms 126 and 127.

As will appear, the platform power cylinders 49 of the assemblies S and C are operated synchronously in order to maintain a horizontal attitude of the platform P during raising and lowering thereof. However, to ensure a substantially level attitude of the platform from side-to-side, notwithstanding off-center loads or any lack of synchronicity between the pair of cylinders, coating means are provided at each of the forward corners of the forward platform section 78 such that any lagging of one runner assembly behind the other is compensated for.

More specifically, referring to FIG. 2, the corner plate 140 at each side of the forward platform section 78 projects above the platform skin and has a channel gusset 143 welded between its inside face and the platform skin 85. At its forward upper edge, the plate 140 has a laterally outwardly directed flange 146 that is substantially parallel to the platform skin and whose underside is reinforced by another gusset 147 welded between the underside of the flange 146 and the outer face of the plate 140. At its free edge, the flange 146 has an integral upstanding flange 148 reinforced by a gusset plate 149 interposed between forward edges of the flange 146 and flange 148.

Each of the runner assemblies is provided at the lower end of its inner face with a box-like structure 152 into and out of which the flange structure of the plate 140 is rotated by turning of the forward platform section between vertical and horizontal positions. Thus, at a position just above the bearing 75, each runner 50 is provided with a horizontally inwardly projecting fixed plate 155 that is enclosed on its underside by vertically depending rear plate 156 and an inside plate 157, the parts being welded to each other and to the corresponding runner. The plate 156 may be formed with a hole 159 to anchor an end of torsion spring 119. Internally, the box-like structure 152 is rigidly fitted with a plate or plates to define an internal slot 160 that is open at the bottom and at the forward side of the block structure. As indicated in FIG. 2, the slot 160 is oriented such that rotation of the forward platform section rotates the flange 148 carried by the platform into and out of the slot 160, the flange having tapered leading edges. Preferably, there is only a small clearance between opposite sides of the flange 148 and the internal walls of the box structure defining the slot 160 so that the two parts are in effect locked against lateral displacement when mutually engaged. The engaged surfaces, being radially offset from the axis of the pair of platform pivot pins 128, provide mechanical advantage to stabilize the forward platform section in a horizontal attitude from side-to-side.

Figure 20:
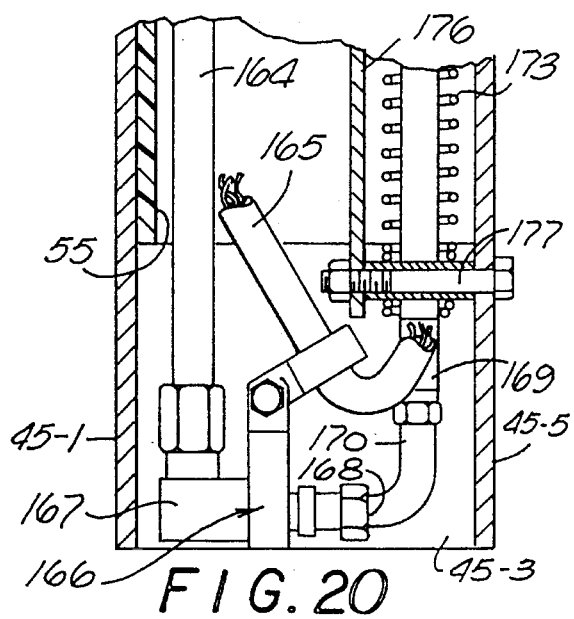
FIG. 20 is a partial vertical sectional view taken of the area 20 of FIG. 16.

The curb side assembly C has a length of hydraulic tubing 164 extending vertically through the passage 56 within the track 53 alongside an electrical harness 165. A clip assembly 166 is interiorly mounted on the rear wall 45-3 of the column at its lower end to support an assembly of fittings 167 and 168 providing fluid communication between the lower end of the tube 164 and the lower end of a length of flexible hose 169 (FIG. 20). The clip assembly also supports and restrains a portion of the harness 165 which passes therethrough to turn upwardly to be trained alongside the flexible hose 169. The hose 169 and the companion portion of the harness 165 are trained upwardly and reversely bent through a bight 174 with the hose terminating at an elbow 170 providing fluid communication to the interior of the cylinder to deliver fluid under pressure to the underside of the piston therein (FIG. 15).

In order to control the flexure of the hose 169 and the companion length of harness 165, during reciprocation of the runner assembly, they are wrapped by a helically coiled wire 173 and guided in an opposing pair of channels formed in the lower end of the runner 50 and column 45. More specifically, referring to FIGS. 18 through 20, portions of the runner walls 50-1 and 50-4 are cut away at an intermediate portion of their common corner to fixedly mount a vertical length of channel 175 whose open side faces the column 45. A similar channel is formed in the column 45 by removal of an edge portion of the track 53 in its lower end portion adjacent to the flange 45-5 and by fixedly mounting an elongate strip 176 extending between the inside face of the channel 45-3 and the cut-away edge of the track 53. In order to anchor one end of the helical wire 173, a fastener means 177 is connected between the column flange 45-5 and the strip 176 adjacent their lower ends to capture adjacent end coils of the wire 173.

The vertical extent of the channel 175 of the runner is so oriented relative to the vertical extent of the opposing channel formed by the strip 176 on the column 45 that when the runner is in the raised position an upper end portion of the column channel confronts a lower end portion of the channel 175 of the runner. A portion of the electrical harness 165 extends upwardly through an open upper end of the channel 175 and is trained interiorly through the runner to terminate at a switch 178 at the upper end of the runner operable externally of the runner as by an operator standing on the platform or the bed of the truck to raise or lower the platform (FIG. 16). As will now be evident, the composite structure comprising the companion portions of the hose 169 and harness 165 encased in the wire coil 172 flex through the running bight 174 during reciprocation of the runner while the opposite leg portions of the composite structure are protectively shielded within their respective channels.

Figures 23, 24, 25:
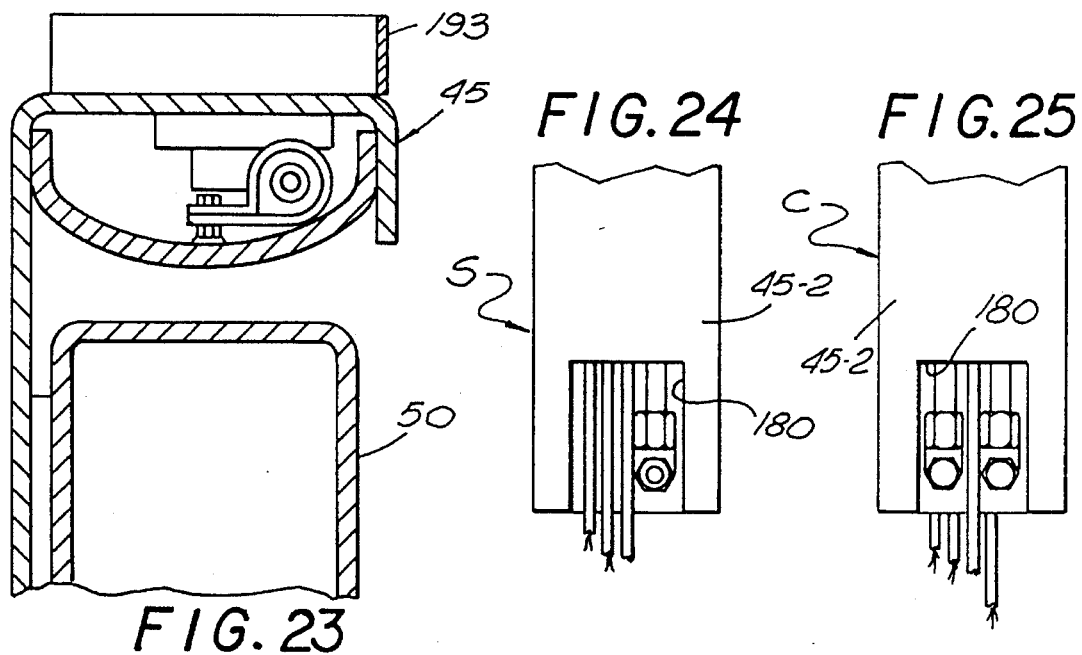
FIG. 23 is a partial sectional view taken on the line 23—23 of FIG. 14.
FIG. 24 is a partial elevational view of the lower end portion of the forward face of the street side column assembly.
FIG. 25 is a partial elevational view of the lower end of the forward side of the curb side column assembly.

Referring to FIGS. 24 and 25, the forward wall 45-2 of each of the columns 45 is formed at its lower end with a window or aperture 180. Access is thus provided to the interior of the passage 54 under the corresponding track 52 for the electrical harnesses and fluid conduits appropriate for the corresponding column assembly C or S. The accessible ends of the electrical harnesses accessible at the aperture 180 are fitted with plugs or receptacles for connection to and disconnection from an external source of electrical power. Similarly, the ends of the hydraulic conduits accessible through the aperture 180 are fitted with couplings for connection to and disconnection from an external source of pressurized hydraulic fluid. As is shown in FIGS. 18 and 22, the corresponding conduits and harnesses are trained vertically through the passage 54. In the case of both column assemblies the fluid power circuit includes a length of tubing 182 extending the length of the corresponding cylinder 49 having valve controlled fluid communication with the lower end of the corresponding cylinder.

Figure 21:
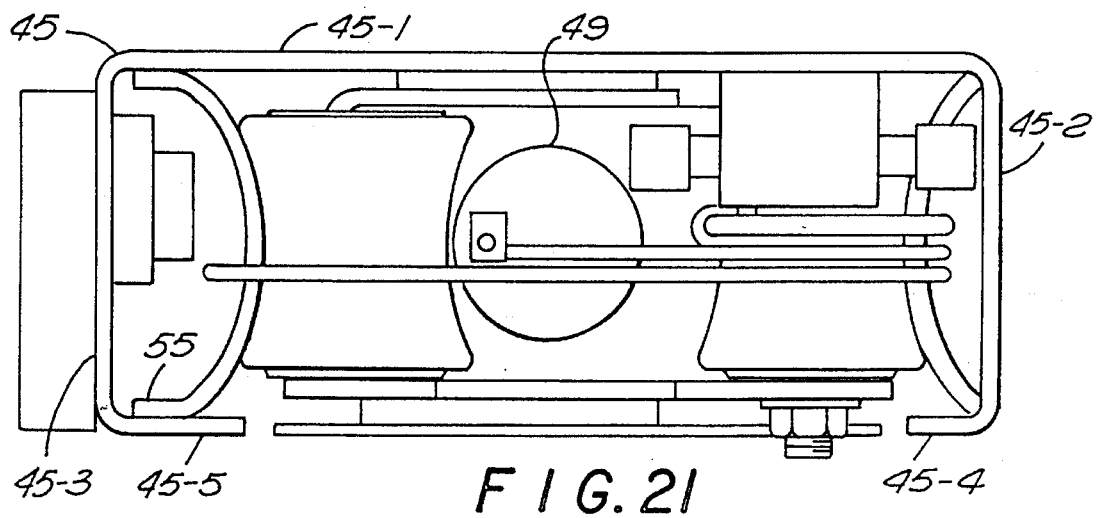
FIG. 21 is a top view taken in the direction 21 of FIG. 14, the cover of the assembly having been removed.

Referring to FIGS. 18 and 21, one electrical harness is trained through the upper end of the corresponding column and thence downwardly through the passage 56 under the rear track 53 for connection to the housings of a vertically spaced apart series of lamps 190, 191 and 192 internally mounted on and protected by the rear wall 45-3 of the corresponding channel. The lamp lenses protrude slightly rearwardly beyond the external surface of the channel but are protected against breakage by a vertically extending flange 193, having arcuate opposite end portions, externally affixed to the rear wall of the channel, protruding rearwardly a dimension slightly greater than the lenses. Preferably, the vertical array of lamps 190–192 is positioned above the level of the truck bed 41. The lamps may comprise stop lights, warning lights and turn signals and, as is evident, because of their relationship relative to the platform P are not subject to being blanked out in any phase of operation of the liftgate.

Figure 31:
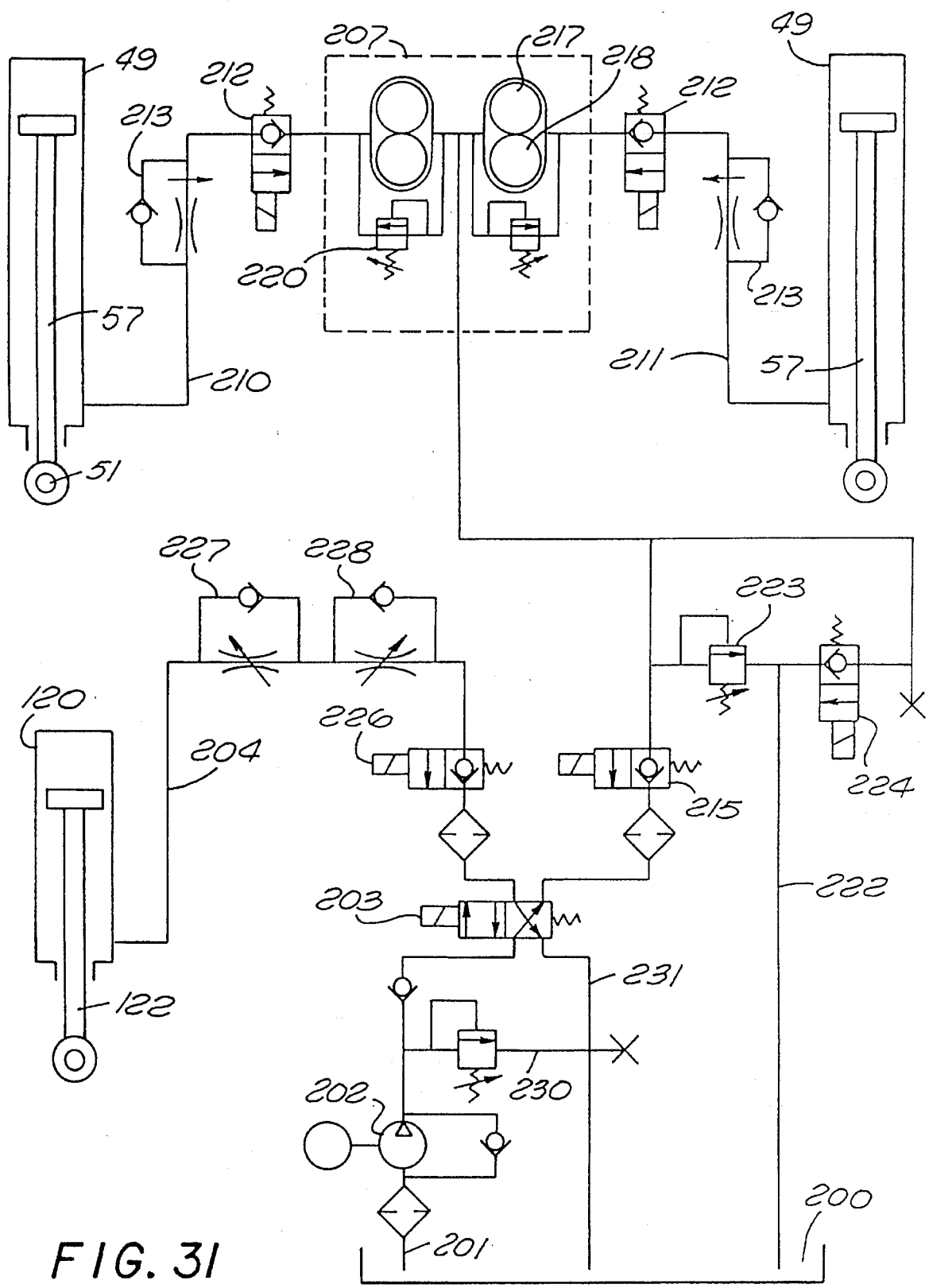
FIG. 31 is a schematic drawing of the equalizing circuit for the main power cylinders of the curb side and street side columnar power assemblies.

FIG. 31 is a schematic diagram of the hydraulic circuit employed with the apparatus. The circuit comprises a reservoir 200 communicating with a supply line 201 that passes through a motor and pump assembly 202. The downstream end of the line 201 communicates with a selector valve 203 by means of which fluid under pressure can be communicated alternatively to either a conduit 204 leading to the lower end of the platform cylinder 120 or a conduit 206 communicating with the input port of a flow divider 207. An opposite pair of outlet ports of the divider have fluid communication via conduits 210 and 211, respectively, with the piston rod ends of the pair of power cylinders 49. Each of the conduit means 210 and 211 incorporates a solenoid controlled normally open hydraulic lock valve 212, fitted with a manual override, as well as a pressure compensated velocity control valve 213.

When the selector valve 203 is actuated in a mode for lifting the load carried by the piston rods of the cylinders 49, a solenoid controlled check valve 215 in the conduit 206 is opened to supply pressurized fluid to the input port of the flow divider 207. The flow divider body has an inlet communicating with a pair of passages for dividing the flow of hydraulic fluid between the inlet and the pair of power cylinders 49. Each of the pair of passages communicating to the power cylinders is fitted with a means for positively displacing and being positively displaced by the fluid flowing therethrough. The flow divider 207 may be Model No. PM6, obtainable from MTE Hydraulics, Inc., of Rockford, Ill., which contains two pairs of spur-toothed idler rotors 217 and 218, there being one such pair within the flow passage to each of the conduits 210 and 211. Each rotor 217 meshes with its companion rotor 218. At the same time, the two rotors 217 are keyed together for synchronous rotation, as by mounting on a common shaft, as are the two rotors 218 at the diametral plane of the flow passage. The resulting synchronized rotation of each companion pair of rotors 217 and 218 occurs simultaneously in either direction, as driven by and depending on the direction of flow through the outlet ports. Associated with each outlet to conduits 210 and 211, spanning opposite sides of the companion pair of rotors 217 and 218, is a shunt conduit incorporating a relief valve 220 that opens in response to a pre-determined back pressure from the associated cylinder 49 to recirculate fluid through the shunt.

Between the valve 215 and divider 207, the conduit 206 has a shunt circuit including a return line 222 having a relief valve 223 on one side and a solenoid controlled valve 224 on the other side of an inlet to a return line 222 to the reservoir.

When the selector valve 203 is set into a mode to communicate fluid pressure to the conduit 204 for the platform cylinder 120, a solenoid check valve 226 in the conduit 204 is opened to pass pressurized fluid to the lower end of the platform cylinder 120. The conduit 204 also incorporates a pair of flow control valves 227 and 228, one of which is adjusted to vary the rate of movement of the cylinder piston in one direction while the other may be adjusted to vary the rate of movement of the cylinder piston in the other direction.

The hydraulic circuit may also incorporate a known auxiliary circuit 230 incorporating a relief valve and hand-pump mechanism in order to operate the liftgate in the event of failure of the pump and motor 202.

In the interest of clarity, return lines from the butt ends of the cylinders 49 and 120 to the reservoir 200 have not been shown. However, it will be understood that return lines comprise normal parts of the circuit. In a case where the cylinders are of the single acting type, the return lines will comprise low pressure breather lines. In a case where double acting cylinders are desired, high pressure lines will be employed and the selector valves accordingly modified.

The mode of operation of the invention should be apparent to those of ordinary skill in the art from the foregoing description and the drawings. Summarizing, let it be assumed that the platform sections are in the fully folded and raised transit position of FIG. 4. Upon actuation of the electrical control system in a mode to open the valves 203 and 215, fluid is evacuated through the lower ends of the pair of cylinders 49 through conduits 210 and 211, normally open valves 212, conduit 206, valves 215 and 203 and into a reservoir return line 231 as the platforms descend under the influence of gravity. During descent of the platform, after the wedge block 115 clears the cam block 117 both platform sections are maintained in a substantially erect position by the hydrostatic head under the piston of the platform cylinder 120 as checked by the normally closed valve 226. Assuming it is desired to maintain the platforms in dock loading position, the folded platforms are then lowered to ground level.

Assuming the platform sections are to be opened into a common horizontal plane for loading and unloading, after the wedge block 114 has cleared the cam block 117, further downward movement of the platforms is arrested by release of the control switch to thereby effect closure of the valves 203 and 215. Thereupon, the electrical control circuit is operated in a mode to open the valve 203 into communication with the conduit 204 while obturating the conduit 206. Simultaneously, the valve 226 is opened. As the pump and motor 202 is idle in this phase and as the weight of the platform sections is rearwardly over-center with respect to the platform hinge pins 128, the platforms are gravitationally biased into the full open position as fluid drains from the bottom end of the platform cylinder 120 through the conduit 204, valve 206, valve 203 and reservoir return line 231. The rate of opening may be altered by means of the restrictor valve 228.

Thereafter, each bracket flange 148 now being seated in its slot 160, loading and unloading operations can be carried out on the open platform P by appropriate actuation of the valve 203 and pump 202. During raising and lowering synchronized movement of the piston rods of the pair of cylinders 49 and a substantially horizontal attitude of the platform P is maintained by the pair of idler rotors 217,218 or by the combination of the operation of the idler rotors and the mutual interaction of the platform hinge flanges 148 and runner bracket slots 160. Thus, the keyed together pairs of idler rotors 217, 218, while operating synchronously, nevertheless appear to permit leakage therearound internally of the body of divider 207 in a manner to equalize or stabilize hydraulic pressures within the pair of cylinders 49. At the same time, each of the platform/hinge contacts 148, 160 at each side of the platform at all times operate to maintain or force the adjoining side portion of the forward platform section into an orthogonal relationship relative to the vertical axis of the companion column assembly, which force is translated through the structural beam forward edge of the forward platform section to the bracket combination 148, 160 on the other side of the platform. Thus, if one side of the platform tends to lag behind the other side, the first side is borne along by virtue of the bracket interconnection, via the platform, to the opposite side runner. The converse is equally true in that a runner assembly on one side of the platform moving in advance of the runner assembly on the other side tends to carry along the runner assembly of the other side via the interaction of the brackets and platform hinge connections 148, 160.

To close the platform P and raise it to transit position, the open platform is first elevated to a slightly above ground position sufficient to provide clearance for movement of the outer platform section 79 in the mode shown in FIG. 6. The valve 203 is then energized to pass fluid pressurized by the pump 202 through the conduit 204 into the lower end of the cylinder 120. The two platform sections are thus folded together into the substantially vertically erect condition shown in FIG. 11 while the actuator bars 93 and their corresponding chains 92 are simultaneously restrained into alignment with their respective clearances at opposite sides of the platform (see FIG. 5). Thereafter, the selector valve 203 is operated in a mode to close the conduit 204 and to pass pressurized fluid into the conduit 206 for raising the collapsed platform sections and squeezing them together by the action of the cam block 117 and wedge block 114 in the manner previously described. The platform sections are thus raised from the FIG. 11 condition into the FIG. 10 condition to an upper limit shown in FIG. 15. Raising of the platform sections to the upper limit effects closure of the normally open valves 212 (FIG. 15) thus effecting a hydraulic lock at each side of the raised platforms to maintain their transit position.

The geometry of the columnar assemblies automatically compensates for wear occurring in the rollers 59 and 60. Also, the geometry of the rollers 59 and 60 and tracks 52 and 53 maintains their mutual contact irrespective of roller wear and deflection of the column walls supporting the tracks 52 and 53.

More particularly, as a result of the heretofore described alignment of the cylinder butt end pin 47, runner supporting pin 51, and platform bearings 75 and the resulting slightly canted attitude of the runner assembly, loads on the platform P are transmitted to the lower set of rollers 60 to react against the forward track 52 to react against the rear track 53 through the upper rollers 59. Accordingly, as wear occurs on the concave surfaces of the rollers the corresponding runner assembly, by virtue of its pin connection 51 to the piston rod of the cylinder 49, at all times biases rollers 59 and 60 into uniform contact with their respective tracks irrespective of reduction in roller diameter. In this connection, the tandem mounting of the upper and lower rollers, pivotally mounted at 63, uniformly distributes the load between each roller of the tandem pair. As wear occurs on the rollers, the runner comes towards parallelism of its longitudinal axis with the vertical axis of the corresponding column. Excessive wear of the rollers may be indicated by the runner coming into a reversely canted attitude such that it slopes downwardly and forwardly of the column, thereupon signalling an occasion for replacement of the rollers.

FIG. 26 in dotted outline is a greatly exaggerated depiction of the deflection of the opposite column walls mounting the tracks 52 and 53 and is depicted in solid outline in FIG. 28. Notwithstanding such deflection, rollers 59 and 60 are mounted on their support shafts 65 to be shiftable axially therealong so that each roller 59 and 60 maintains contact between its concave surface and the convex surface of the corresponding track uniformly from one end to the other. Referring to FIG. 27, it will be seen that there is an appreciable clearance between each end of the rollers 59 and 60 and the inside faces of their support straps 64. Thus, as shown in FIG. 28, upon any appreciable deflection of the column walls 45-2 or 45-3 relative to the web 45-1 of the column, each roller 59 or 60 automatically shifts axially of its supporting shaft 65 to maintain uniform contact from one side to the other with a convex surface of the corresponding track. Automatic self-centering of each roller with respect to its track occurs irrespective of wear on the rollers and distortion of the supporting column and is maintained since the runner is mounted in a way to alter its canted attitude.

Figure 32:
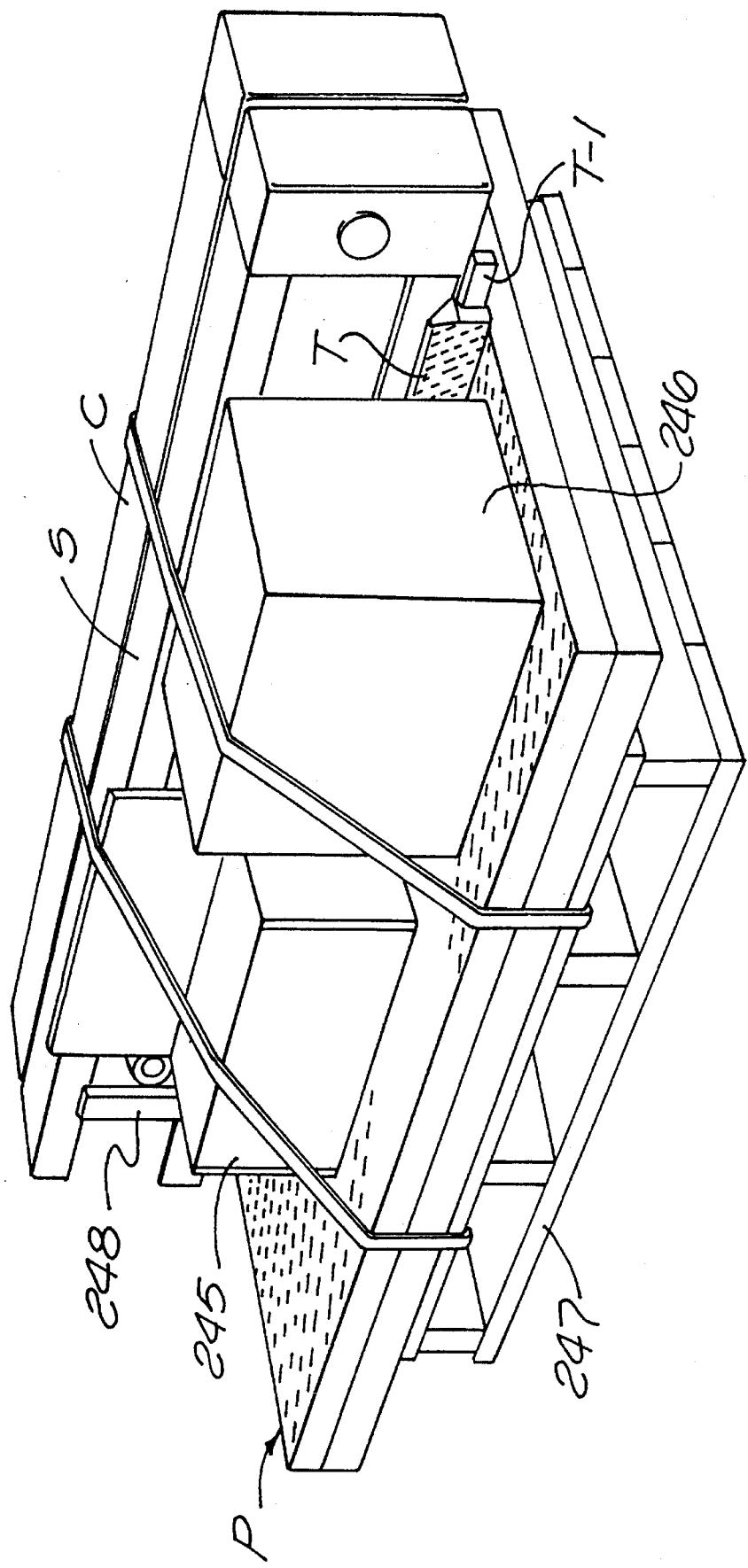
FIG. 32 is a schematic representation of the several components of a liftgate of the invention as bundled for shipment to a point of application to a vehicle or other point of use.

As shown in FIG. 32, the components of the liftgate may be packed for shipment to an end-user as an unassembled package of components. Thus, the package may comprise street side and curb side columnar power assemblies C and S, a threshold plate T, a platform P of one or more sections, a power pack 245 and a parts box 246, all conventionally strapped to a conventional pallet 247. In order to maintain its runner assembly and power cylinder in a fully retracted condition during shipping and handling, each columnar power assembly may have a shipping strap 248 tack welded thereto to engage the underside of the bearing 75 (FIG. 15). The package may include special mounting fixtures whereby the threshold plate T is first secured in place followed by attachment of the street side and curb side column assemblies S and C to the rear of the truck to be squared up relative to the threshold plate T and indexed on pins T-1 projecting from opposite ends of the threshold plate. The platform P can then be positioned in place for the reception of the pair of pivot pins 128 after which the upper ends of the pair of chains 92 are connected to the pivot arms 90 of the pair of runner assemblies.

We claim:

1. A lift comprising:

a vertically extending parallel pair of fixedly spaced apart guide surfaces;

a linear actuator suspended from an upper end of and extending vertically between said pair of guide surfaces;

a vertically elongate runner means having a pivotal connection to a lower end of said linear actuator to be vertically reciprocated by said actuator;

a load bearing means at a lower end of said runner means at a location spaced downwardly from said pivotal connection; and a vertically spaced apart pair of contact means on said runner means for relatively movable contact with said pair of guide surfaces during vertical reciprocation of said runner means by said actuator, a first one of said contact means being mounted at an upper end of said runner means, the second of said contact means being mounted on an intermediate portion of said runner means between said first contact means and said pivotal connection, said pair of contact means being mounted on opposite sides of said runner means for contact with opposite ones of said pair of guide surfaces.

2. A lift as in claim 1 in which:

said actuator is pivotally suspended on an axis transverse to a plane including said pair of guide surfaces; and said pivotal connection of said runner means and said actuator has an axis parallel to said transverse pivot axis of said actuator and horizontally offset from a longitudinal axis of said runner means.

3. A lift as in claim 2 in which:

said pair of contact means and said pivotal connection of said runner means are so oriented relative to another that said longitudinal axis of said runner means is misaligned relative to a longitudinal axis of said guide surfaces.

4. A lift as in claim 2 in which:

each of said contact means comprises a roller.

5. A lift as in claim 2 in which:

each of said pair of contact means comprises a vertically spaced apart tandem pair of rollers on a support for said tandem pair of rollers that is pivotally connected to said runner means.

6. A lift as in claim 3 in which:

said first one of said contact means is at a rear side of said lift;

said second one of said contact means is at a forward side of said lift; and said load bearing means comprises means to support a load at said rear side of said lift for biasing, via said runner means, said second contact means against a front one of said guide surfaces and biasing said second contact means against a rear one of said guide surfaces.

7. A lift as in claim 1 in which:

each of said contact means comprises a roller having an arcuately concave surface for contact with one of said guide surfaces;

each of said guide surfaces comprising an arcuately convex track surface for contact with one of said rollers;

each of said rollers and each of said track surfaces having substantially the same radius for substantially uniform mating contact therebetween substantially throughout the axial width of said roller;

said rollers and said track surfaces having the centers of their respective radii within a common vertical plane substantially bisecting said rollers and said track surfaces.

8. A lift as in claim 7 in which:

said pair of contact means and said pivotal connection of said runner means are so oriented relative to one another that said longitudinal axis of said runner means is misaligned relative to a longitudinal axis of said guide surfaces;

whereby wear between said rollers and said track surfaces permits displacement of said longitudinal axis of said runner means toward alignment with said longitudinal axis between said track means while maintaining substantially uniform contact between said rollers and said track surfaces.

9. A lift as in claim 1 in which:

each of said contact means comprises a roller having an arcuately concave surface for contact with one of said guide surfaces;

each of said guide surfaces comprising an arcuately convex track surface for contact with one of said rollers;

each of said rollers and each of said track surfaces having substantially the same radius for substantially uniform contact therebetween substantially throughout the axial width of said roller;

said rollers and said track surfaces having the centers of their respective radii initially within a common vertical plane substantially bisecting said rollers and said track surfaces;

each of said rollers being mounted for axial displacement relative to the corresponding one of said track surfaces for maintaining substantial uniform contact therebetween substantially throughout the axial width of said roller upon deflection of a track surface.

10. A lift comprising:

a vertically extending lift column:

a vertically elongate runner means telescopically mounted within said column for vertical reciprocation between a lowered position in which a lower end portion of said runner means protrudes below said column and a raised retracted position;

a vertically extending channel formed in said runner means having an open side confronting a vertical wall portion of said column;

a vertically extending channel formed in a said wall portion of said column having an open side oriented toward communication with said channel of said runner means;

said channel of said runner means and said channel of said column being so oriented relative to one another that when said runner means is in said raised position an upper end portion of said channel of said column confronts a lower end portion of said channel of said runner means;

a flexible element having a first leg trained vertically in said channel of said column and having an upper bight to a second leg portion of said element trained vertically in said channel of said runner means; and said bight running through said flexible element during reciprocation of said runner means relative to said column while maintaining said first and second leg portions thereof within their respective channels.

11. A lift as in claim 10 in which:

said flexible element comprises a length of hose having a terminal end of said second leg portion connected to an actuator mounted at said lower end of said runner means.

12. A lift as in claim 10 in which:

said flexible element comprises a length of electrical harness;

and said runner means comprises a tubular element having an electrical switch mounted externally on said runner means at a location remote from said channel of said runner means;

said electrical harness being trained interiorly within said runner means from said switch as an extension of said second leg portion of said flexible element.

13. A lift as in claim 10 in which:

said flexible element comprises a composite of a length of hose and a length of electrical harness;

said composite being encased in a major portion of its length within a helical wire coil;

a lower end portion of said channel of said column having a means for pinning an end portion of said coil and composite harness to said column.

14. A liftgate comprising:

a vertically spaced apart parallel pair of vertically extending columns having inner open sides confronting one another;

a vertically reciprocable runner means telescopically mounted within each of said columns;

a forward platform section having a pivotal connection along a forward edge thereof to lower ends of said pair of runner means for movement between a substantially vertically erect position and a rearwardly projecting horizontal load bearing position;

a rear platform section having a forward edge pivotally connected along a rear edge of said forward platform section by a hinge means whereby said rear platform section can be inverted into substantial parallelism with said forward platform section when said forward platform section is in said vertical position;

said forward platform section having said pivotal connection to said runner means so located that said forward and rear platform sections when in the erect positions are recessed forwardly of a vertical plane including rear faces of said pair of columns, said platform sections having a width less than the span between inner confronting faces of said pair of runner means;

a linkage system at each side of said platforms each of said linkage systems comprising an elongate flexible member having a rear end connected to a rear end portion of said rear platform section and having a forward end connected to an inner face of an intermediate portion of said runner assembly;

an actuator bar having a root end pivotally connected to a side of said rear platform section adjacent to said butt hinge means, a free end of said actuator arm being pinned to an intermediate portion of said flexible member;

a first bracket secured to a side of said rear platform section for limiting rotation of said actuator bar relative to said rear platform section during folding of said platform sections; and a second bracket secured to said root end of said actuator arm for receiving a portion of said flexible member during folding of said platform sections to restrain said portion of said flexible member laterally into alignment with the corresponding sides of said platform sections, whereby when said platform sections are folded into said erect position said flexible member and actuating bar are disposed within a clearance between a side of said platform sections and said inner face of the corresponding one of said runner means and recessed with respect to said plane.

15. A liftgate as in claim, 14 in which:

one of said runner assemblies has a crank means for turning said forward platform section from horizontal position to vertical position; and said inner faces of said pair of runner means and opposite sides of said forward platform section have coacting stop means for arresting said forward platform section in an erect position.

16. A liftgate as in claim 15 in which:

each of said actuating arms is fitted with a wedge block; and each of said columns has a cam block fitted on an inside face thereof disposed in interfering alignment with the corresponding one of said wedge blocks when said pair of platforms in the erect position are disposed therebetween;

said cam blocks and wedge blocks having cooperating surfaces for biasing said rear platform section toward parallelism with said forward platform section upon raising of said platform sections by said runner means.

17. A liftgate as in claim 16 in which:

said stop means comprises a coacting pair of members at least one of which is padded;

a compressible pad means is interposed between undersides of said forward and rear platform sections; and a pad is mounted on said first bracket, all of said pads being compressed by coaction of said cam block and wedge block.

18. A liftgate as in claim 14 in which:

said second bracket comprises an L-shaped flange having a slot formed in an edge thereof oriented for the reception of a portion of said flexible member during folding and unfolding of said platform sections.

19. A columnar power assembly comprising:

a column having an integral pair of opposite walls;

an opposing pair of guide surfaces fixed within and along said opposite walls;

each of said guide surfaces being spaced from the corresponding one of said walls to define a passage therebetween;

a linear actuator having one end mounted at one end of said column to extend therefrom within and between said pair of guide surfaces;

a runner means drivably connected to an actuating end of said actuator means;

said runner means having vertically spaced apart contact means mounted on opposite sides thereof for relatively movable contact with said pair of guide surfaces; and a conduit means for connecting said linear actuator to a source of fluid power, said conduit means having one end operatively connected to said actuator and being trained therefrom through at least one of said passages to terminate at a second end thereof that is externally accessible at an aperture formed in said column;

said second end of said conduit means being fitted with a coupling means for connection to and disconnection from an external source of fluid power.

20. A columnar power assembly as in claim 19 having:

an externally visible lamp internally mounted within said column within one of said passages; and an electrical harness for connecting said lamp to a source of electrical power;

said harness having one end operatively connected to said lamp and being trained therefrom through at least one of said passages to terminate at an externally accessible second end thereof at said aperture;

said second end of said harness having a means for connection to and disconnection from an external source of electrical power.

21. A columnar power assembly as in claim 19 in which:

a second actuator is mounted on said runner means distally of said actuating end of said first actuator means;

said column internally mounting a second conduit means for connecting said second linear actuator to a source of fluid power;

said second conduit means having one end operatively connected to said second actuator and being trained therefrom through a running bight into communication with and through at least one of said passages, said second conduit means having a second end that is externally accessible at said aperture and fitted with a means for connection to and disconnection from an external source of fluid power.

22. A columnar power assembly as in claim 19 in which:

said runner means has an electrical switch mounted externally thereof; and an electrical harness is trained interiorly within said runner means from said switch toward said actuating end of said actuator means to be trained externally of said runner means through a running bight into communication with and through one of said passages;

said harness means having a second end that is externally accessible at said aperture and fitted with a means for connection to and disconnection from an external source of electrical power.

23. A platform as in claim 19 in which:

said column is fitted with a detachable means engaged with said runner means at the other end of said column to retain said runner means within said column during shipment and handling of said columnar power assembly.

24. A load platform for a liftgate comprising:

a rigid rectangular frame;

a load bearing skin peripherally rigidly secured to a top of said frame;

a rectangular corrugated sheet congruently fitted within and peripherally rigidly secured within said frame, said corrugated sheet having crest portions spaced from said skin, said corrugated sheet having root portions fixedly secured to said skin at least at spaced apart locations along said root portions, whereby to define a plurality of beam-like structures extending transversely across said platform.

25. A load platform as in claim 24 in which:

said corrugated sheet is formed with flat crest and root portions.

26. A platform comprising a pair of platforms as in claim 24 further characterized in that:

said pair of platforms are hingedly interconnected along adjacent edges thereof by a hinge means having an axis off-set from said skins of said platforms to permit folding of said pair of platforms into substantial parallelism;

one of said platforms in a root portion thereof being fitted with a bumper pad projecting toward the other of said platforms, the other of said platforms being fitted with in a root portion thereof with a projecting pad contact member, said bumper pad and said pad contact member being proportioned to effect compression of said bumper pad upon said two platform sections being brought into parallelism.

27. A liftgate comprising:

a threshold plate having a flat upper face to comprise a substantially flush rearward extension of a vehicle bed;

a pair of columnar lift assemblies mountable in vertical parallel relationship on a vehicle at opposite ends of said threshold plate, each of said columnar assemblies comprising a column having an inside surface formed with a vertically extending opening extending upward from a lower end of said column and a runner mounted within each of said columns for vertical telescopic reciprocation therein;

a substantially rectangular platform pivotally connectable at opposite lateral sides of a forward edge frame member thereof to lower ends of said pair of runners by a pivot means whereby said platform can be turned between a load bearing position extending horizontally rearwardly from said columns and an upstanding vertically erect position;

said pivot means including a pair of coaxially related bearing means each of which is mounted at said lower end of the corresponding runner at a location to permit vertical translation of said platform when said platform is in said vertically erect position with clearance past a rear edge of said threshold plate;

each of said assemblies having a linear actuator for vertically reciprocating said runners between a transit position and a dock loading position of said platform, said platform when in said dock loading position being vertically erect and having a rear edge frame member thereof positionable adjacent to said flat upper face of said threshold bar in close proximity thereto;

said platform having said forward edge frame member positionable in close proximity to said rear edge of said flat upper face of said threshold member when said platform is disposed in an elevated horizontal load bearing position adjacent to said threshold plate.

28. A liftgate as in claim 27 in which:

said threshold plate, said pair of columnar lift assemblies and said platform comprise an unassembled set of components;

said pivot means comprising a pair of pivot pins for detachably connecting said platform to said pair of runners.

29. A liftgate as in claim 28 in which:

said threshold plate comprises an integral pair of indexing pins projecting longitudinally beyond opposite ends of said threshold plate for indexing said pair of columnar lift assemblies with respect to said threshold plate in mounting said components on a vehicle.

30. A liftgate as in claim 27 in which:

said threshold plate is of substantially triangular cross-sectional configuration having an underside sloping forwardly and downwardly from a said rear edge thereof to provide clearance for rotation of said forward edge frame of said platform.

31. A dual lift system comprising:

a pair of vertical columns;

a runner mounted on each of said pair of columns for reciprocable movement therealong;

a linear actuator on each of said columns for vertically reciprocating said pair of runners;

a source of fluid power for actuating said pair of linear actuators in a circuit means providing fluid communication from said source of fluid power to said pair of actuators;

a load platform;

pivot means for pivotally connecting a pair of opposite sides of said platform to said pair of runners on a horizontal pivot axis; and coacting interengageable and disengageable means on each of said platform sides and the corresponding one of said runners that are mutually engaged when said platform is in a horizontal load-bearing position for resisting deflection of said platform out of orthogonal relationship relative to said pair of runners whereby to inhibit non-synchronous movement of said runners arising from non-synchronous actuation of said actuators by said source of fluid power.

32. A system as in claim 31 in which:

said coacting means comprise rigid integral parts of said platform and said runner having opposed confronting surfaces radially offset from and oriented angularly relative to said horizontal pivot axis of said platform.

33. A system as in claim 32 in which:

said confronting surfaces comprise a flange carried by said platform and a slot structure carried by said runner, said flange and said slot being oriented normally to said pivot axis within a plane in which said flange moves upon pivotal movement of said platform.

34. A system as in claim 32 in which: said coacting means comprises a structural beam that comprises an edge frame of said platform and said pivot axis.

35. A dual lift system comprising:

a pair of vertical columns, each of said columns having a runner means mounted for reciprocation vertically along said column;

a hydraulic linear actuator on each of said columns for reciprocating said pair of runner means;

a source of hydraulic power for actuating said pair of actuators;

circuit means providing fluid communication from said source to said pair of actuators in parallel through a flow divider;

a lift platform;

pivot means for pivotally connecting a pair of opposite sides of said platform to said pair of runner means on a horizontal pivot axis;

each of said platform sides and the corresponding one of said runner means having coacting means that are engaged when said platform is in a horizontal load bearing position for resisting deflection of said platform out of orthogonal relationship relative to said pair of runners, whereby to inhibit non-synchronous movement of said runner means arising from non-synchronous actuation of said actuators by said source of fluid power.

36. A dual lift system as in claim 35 in which:

said flow divider comprises a body having an inlet from said source and a pair of passages for dividing the flow of hydraulic fluid between said inlet and said pair of actuators;

a pair of positive fluid displacement means in said pair of passages responsive to the flow of fluid therethrough in either direction for positively displacing fluid in said passage in either direction; and a coupling means operatively coupled between said pair of positive displacement means for effecting actuation of said pair of positive displacement means at substantially the same rate for substantially equal displacement of fluid through said pair of passages.

37. A dual lift system as in claim 36 in which:

each of said positive displacement means comprises a meshed pair of spur gears.

38. A dual lift system as in claim 36 in which:

said coacting means comprise rigid integral parts of said platform and said runner means having opposed confronting surfaces radially off-set from and oriented angularly relative to said horizontal pivot axis of said platform.

39. A dual lift system comprising:

a pair of vertical columns, each of said columns having a runner means mounted for reciprocation vertically along said column;

a hydraulic linear actuator on each of said columns for reciprocating said pair of runners;

a source of hydraulic power for actuating said pair of actuators;

circuit means providing fluid communication from said source to said pair of actuators in parallel through a flow divider for raising and lowering a load carried between said columns by said pair of runner means;

said flow divider comprising a body having an inlet from said source and a pair of passages for dividing the flow of hydraulic fluid between said inlet and said pair of actuators;

a pair of positive fluid displacement means in each of said pair of passages responsive to the flow of fluid therethrough in either direction for positively displacing fluid in said passage in either direction; and a coupling means operatively coupled between said pair of positive displacement means for effecting actuation of said pair of positive displacement means at substantially the same rate for substantially equal displacement of fluid through said pair of passages.

40. A dual lift system as in claim 39 in which:

each of said pair of positive displacement means comprises a pair of meshing spur gears.

41. A dual lift system as in claim 39 in which:

each of said pair of passages of said flow divider body communicates with a shunt passage having a relief valve operatively associated therewith, each of said relief valves being pre-set to open in response to a pre-determined back pressure from the associated one of said actuators to recirculate fluid through said shunt passage in response to said back pressure.

* * * * *

UNITED STATES PATENT AND TRADEMARK OFFICE
CERTIFICATE OF CORRECTION

PATENT NO. : 5,513,943
DATED : May 7, 1996
INVENTOR(S) : Larry Lugash, Karapet Alabutyan It is certified that error appears in the above-identified patent and that said Letters Patent is hereby corrected as shown below:

In col. 1, at lines 10,17,26,28, "lead" should read --load--.

In col. 12, at line 7, "coating" should read --coacting--.

Signed and Sealed this

Second Day of July, 1996

Attest:

BRUCE LEHMAN

*Attesting Officer*  *Commissioner of Patents and Trademarks*

Disclaimer 5,513,943—Larry Lugash; Karapet Ablabutyan, both of Los Angeles; Samson Mkrtchyan, Burbank, all of Calif. LOAD ELEVATOR WITH COLUMNAR POWER ASSEMBLIES. Patent dated May 7, 1996. Disclaimer filed April 21, 1997, by the assignee, Maxon Industries, Inc.

Hereby enters this disclaimer to claim 1 of said patent.
*(Official Gazette,* June 17, 1997)

Disclaimer 5,513,943 — Larry Lugash; Karapet Ablabutyan, both of Los Angeles; Samson Mkrtchyan, Burbank, all of CA. LOAD ELEVATOR WITH COLUMNAR POWER ASSEMBLIES. Patent dated May 7, 1996. Disclaimer filed February 28, 2000, by the assignee, Maxon Industries, Inc.

Hereby enters this disclaimer to claim 19 of said patent.

*(Official Gazette,* April 18, 2000)